(12) United States Patent
Broekhuijsen et al.

(10) Patent No.: US 8,561,131 B1
(45) Date of Patent: Oct. 15, 2013

(54) ALLOCATING PRODUCTS TO LICENSES ON A COMPUTING DEVICE

(75) Inventors: Jerome Broekhuijsen, Highland, UT (US); Peter E. Johnson, Lehi, UT (US)

(73) Assignee: Crimson Corporation, Dover, DE (US)

( * ) Notice: Subject to any disclaimer, the term of this patent is extended or adjusted under 35 U.S.C. 154(b) by 88 days.

(21) Appl. No.: 13/173,947

(22) Filed: Jun. 30, 2011

(51) Int. Cl.
*G06F 17/00* (2006.01)
*G06F 17/50* (2006.01)
*H04L 29/06* (2006.01)
*A01K 5/02* (2006.01)

(52) U.S. Cl.
USPC .................................................. 726/1; 705/29

(58) Field of Classification Search
USPC ............................................................ 726/1
See application file for complete search history.

(56) References Cited

U.S. PATENT DOCUMENTS

| | | | | |
|---|---|---|---|---|
| 7,231,370 B1* | 6/2007 | Kapur | | 705/59 |
| 7,359,882 B2* | 4/2008 | Eng | | 705/59 |
| 7,636,693 B2* | 12/2009 | Faur et al. | | 705/59 |
| 7,716,348 B1* | 5/2010 | Redding et al. | | 709/229 |
| 7,849,019 B2* | 12/2010 | Grimm et al. | | 705/59 |
| 8,086,538 B2* | 12/2011 | D'Alo' et al. | | 705/59 |
| 2004/0078339 A1* | 4/2004 | Goringe et al. | | 705/59 |
| 2006/0015466 A1* | 1/2006 | Noioso et al. | | 705/59 |
| 2007/0005505 A1* | 1/2007 | D'Alo et al. | | 705/59 |
| 2008/0109241 A1* | 5/2008 | D'Alo et al. | | 705/1 |
| 2008/0189131 A1* | 8/2008 | Chavez | | 705/1 |
| 2009/0249494 A1* | 10/2009 | Disciascio et al. | | 726/31 |
| 2010/0293536 A1* | 11/2010 | Nikitin et al. | | 717/168 |
| 2012/0130911 A1* | 5/2012 | Maclellan et al. | | 705/310 |

* cited by examiner

*Primary Examiner* — Carolyn B Kosowski
*Assistant Examiner* — Jason C Chiang
(74) *Attorney, Agent, or Firm* — Austin Rapp & Hardman

(57) ABSTRACT

A computing device configured for allocating products to licenses is described. The computing device includes a processor and instructions stored in memory that is in electronic communication with the processor. The computing device obtains license data that identifies a plurality of licenses. The computing device also obtains product data that identifies a plurality of products. The computing device determines a degree of constraint for each of the plurality of products. The computing device also allocates at least one of the plurality of products to at least one of the plurality of licenses based on the degree of constraint. The computing device further performs an operation based on the allocation.

13 Claims, 9 Drawing Sheets

ALLOCATING PRODUCTS TO LICENSES ON A COMPUTING DEVICE

TECHNICAL FIELD

The present disclosure relates generally to computers and computer-related technology. More specifically, the present disclosure relates to allocating products to licenses on a computing device.

BACKGROUND

The use of electronic devices has become increasingly prevalent in modern society. As the cost of electronic devices has declined and as the usefulness of electronic devices has increased, people are using them for a wide variety of purposes. For example, many people use electronic devices to perform work tasks as well as to seek entertainment. One type of an electronic device is a computer.

Computer technologies continue to advance at a rapid pace. Computers commonly used include everything from hand-held computing devices to large multi-processor computer systems. These computers include software, such as applications including user interfaces, in order to make them useful and accessible to an end user.

One of the challenges involved with computer technologies is that information may not be easily utilized in an efficient manner. In some cases, decision making may be impaired without proper utilization of information. As can be observed from this discussion, systems and methods that improve the utilization of information may be beneficial.

DETAILED DESCRIPTION

Figure 1:
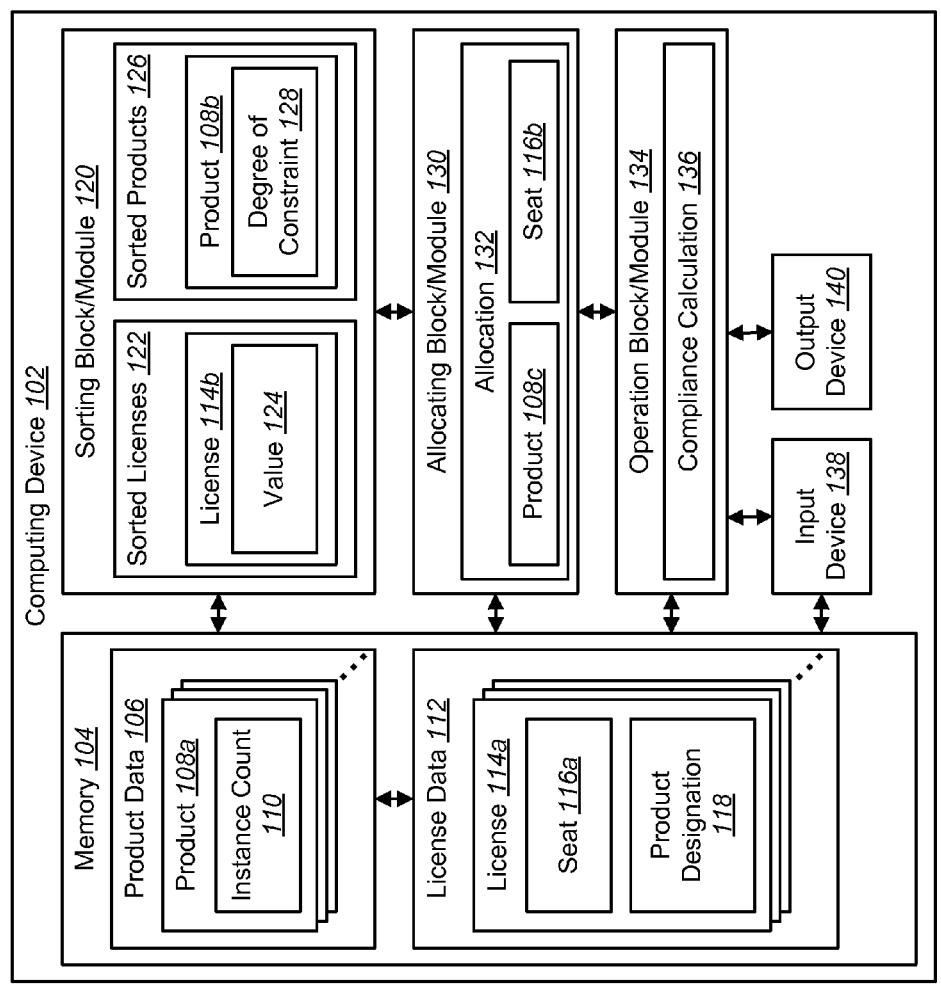
FIG. 1 is a block diagram illustrating one configuration of a computing device in which systems and methods for allocating products to licenses may be implemented.

A computing device configured for allocating products to licenses is disclosed. The computing device includes a processor and executable instructions stored in memory that is in electronic communication with the processor. The computing device obtains license data that identifies a plurality of licenses. The computing device also obtains product data that identifies a plurality of products. The computing device further determines a degree of constraint for each of the plurality of products. The computing device additionally allocates at least one of the plurality of products to at least one of the plurality of licenses based on the degree of constraint. The computing device further performs an operation based on the allocation.

The computing device may further obtain a license value for each of the plurality of licenses. Allocating the at least one of the plurality of products to the at least one of the plurality of licenses may be further based on the license value. Allocating the at least one of the plurality of products to the at least one of the plurality of licenses may include allocating a product with a highest degree of constraint to a license with a least license value.

The computing device may sort each of the plurality of licenses based on the license value. The computing device may also sort each of the plurality of products based on the degree of constraint. Performing an operation based on the allocation may include performing a compliance calculation. The license data may be a licensable unit of related licenses. The product data may be a licensable unit of related products.

A method for allocating products to licenses on a computing device is also disclosed. The method includes obtaining license data that identifies a plurality of licenses. The method also includes obtaining product data that identifies a plurality of products. The method further includes determining a degree of constraint for each of the plurality of products. The method additionally includes allocating at least one of the plurality of products to at least one of the plurality of licenses based on the degree of constraint. The method further includes performing an operation based on the allocation.

A non-transitory, tangible computer-readable medium for allocating products to licenses is additionally disclosed. The computer-readable medium includes executable instructions for obtaining license data that identifies a plurality of licenses. The computer-readable medium also includes executable instructions for obtaining product data that identifies a plurality of products. The computer-readable medium additionally includes executable instructions for determining a degree of constraint for each of the plurality of products. The computer-readable medium also includes executable instructions for allocating at least one of the plurality of products to at least one of the plurality of licenses based on the degree of constraint. The computer-readable medium further includes executable instructions for performing an operation based on the allocation.

One configuration of the systems and methods disclosed herein may be useful for allocating products to licenses on a computing device. In one example, the allocation of products to licenses may be used in connection with a compliance calculation. Proper allocation of products to licenses may ensure overall license compliance. In one example, the allocation of products to licenses may ensure that any leftover (e.g., unneeded, under-utilized) licenses are the licenses deemed most valuable.

In some situations, products may be licensed by multiple licenses, and licenses may be applied to multiple products. This may create a many-to-many relationship between products and licenses. Ensuring compliance may involve making sure that each instance (e.g., installation) of a product is "covered" by a seat of an applicable license. With potentially multiple licenses, each applicable to potentially multiple products, there may be many ways to use the available licenses to sufficiently cover the products. It is possible (even likely) that a manual process for allocating license seats will be inefficient, yielding a false out-of-compliance determination where there are products that are under-licensed and licenses that are under-used. The systems and methods disclosed herein may improve the consumption of licenses such that false out-of-compliance results are eliminated. Further, the systems and methods disclosed herein may take into consideration the relative value of multiple licenses to ensure that the most valuable licenses may be consumed last. This may provide that any under-used licenses resulting from allocation will be those licenses of greatest value.

In one configuration, licenses may be sorted according to value. For example, licenses may be sorted according to increasing value (e.g., lowest value first, highest value last). Any of a number of different criteria may be used to determine a license's value. Examples of valuing criteria include price, ubiquity (e.g., the number of products to which it can be applied), length of remaining license period, opinion, etc. With each product there may be an associated list of licenses (in like sorting order) that may potentially cover that product.

A group of products may be related to each other through multi-product-covering licenses. In one configuration, this group of products may be sorted according to a degree of constraint. The degree of constraint may be calculated as the fraction of (a) the number of product instances (e.g., installations) needing license seats, divided by (b) the number of license seats (from all potentially covering licenses) that could be applied to that product.

In one configuration, following the sorting, the product determined to have the highest degree of constraint is selected to receive a seat from the first license in the sorted list of licenses that may cover that product. This allocation of a product to a license seat may reduce the number of available license seats available and may reduce the number of unallocated products. Consequently, the number of available seats from that license may be decremented, and the number of product instances (e.g., installations) for that product may also be decremented. After the number of product instances and the number of seats available for the selected license have been changed, the products may be again submitted to a calculation of (and subsequent sorting by) the degree of constraint. The product of highest constraint may then be selected for allocation of a license seat. In one instance, the license seat may be from the first license in the sorted list of licenses associated with that product (e.g., the lowest valued applicable license). This process may repeat until either the licenses are all exhausted, or the products are all fully licensed.

In one example, a first license covers a first product, a second license covers the first product and a second product and a third license covers the second product. The first license includes 10 seats, the second license includes 5 seats and the third license includes 8 seats. In this example, there are 12 installations of the first product and 10 installations of the second product. It may be assumed that first license has the lowest value, the second license has the highest value and the third license has a value between the first license and the second license. Therefore, the first product will be covered first by the first license and then by the second license. Similarly, the second product will be covered first by the third license and then by the second license.

In this example, the most constrained product will be allocated to the lowest valued license. In one configuration, the allocation is an iterative process. The first iteration may begin determining the degree of constraint for each product. There are 12 installations of the first product and 15 potential license seats (10 from the first license and 5 from the second license). Therefore, the degree of constraint for the first product is 12 installations/15 seats or 0.800. There are 10 installations of the second product and 13 potential license seats (8 from the third license and 5 from the second license). Therefore, the degree of constraint for the second product is 10 installations/13 seats or 0.769. The first product has the highest degree of constraint (0.800>0.769), so the first product will be allocated to a seat of the first license (e.g., a seat of the first license is consumed by the first product). As a result of the allocation, the number of license seats available is decremented and the number of installations outstanding is decremented. The first license now has 9 potential license seats (decremented from 10) and the first product now has 11 outstanding installations (decremented from 12).

The second iteration may begin by determining the degree of constraint for each product. There are 11 installations of the first product and 14 potential license seats (9 from the first license and 5 from the second license). Therefore, the degree of constraint for the first product is 11 installations/14 seats or 0.786. There are 10 installations of the second product and 13 potential license seats (8 from the third license and 5 from the second license). Therefore, the degree of constraint for the second product is 10 installations/13 seats or 0.769. The first product (again) has the highest degree of constraint (0.786>0.769), so the first product will be allocated to another seat of the first license. As a result of the allocation, the number of license seats available is decremented and the number of installations outstanding is decremented. The first license now has 8 potential license seats (decremented from 9) and the first product now has 10 outstanding installations (decremented from 11).

The third iteration may begin by determining the degree of constraint for each product. There are 10 installations of the first product and 13 potential license seats (8 from the first license and 5 from the second license). Therefore, the degree of constraint for the first product is 10 installations/13 seats or 0.769. There are 10 installations of the second product and 13 potential license seats (8 from the third license and 5 from the second license). Therefore, the degree of constraint for the second product is 10 installations/13 seats or 0.769. On this iteration, there is a tie for most-constrained product (0.786=0.769). The tie may be arbitrarily broken by selecting one of the products. In this example, the first product is chosen. The first product will be allocated to another seat of the first license. As a result of the allocation, the number of license seats available is decremented and the number of installations outstanding is decremented. The first license now has 7 potential license seats (decremented from 8) and the first product now has 9 outstanding installations (decremented from 10).

The fourth iteration may begin by determining the degree of constraint for each product. There are 9 installations of the first product and 12 potential license seats (7 from the first license and 5 from the second license). Therefore, the degree of constraint for the first product is 9 installations/12 seats or 0.750. There are 10 installations of the second product and 13 potential license seats (8 from the third license and 5 from the second license). Therefore, the degree of constraint for the second product is 10 installations/13 seats or 0.769. This time, the second product has the highest degree of constraint (0.769>0.750), so the second product will be allocated to a seat of the third license. As a result of the allocation, the number of license seats available is decremented and the number of installations outstanding is decremented. The third license now has 7 potential license seats (decremented from 8) and the second product now has 9 outstanding installations (decremented from 10).

The fifth iteration may begin by determining the degree of constraint for each product. There are 9 installations of the first product and 12 potential license seats (7 from the first license and 5 from the second license). Therefore, the degree of constraint for the first product is 9 installations/12 seats or 0.750. There are 9 installations of the second product and 12 potential license seats (7 from the third license and 5 from the second license). Therefore, the degree of constraint for the second product is 9 installations/12 seats or 0.750. Once again, there is a tie for the most-constrained product (0.750=0.750). The tie may be arbitrarily broken by selecting one of the products. In this example, the second product is chosen. The second product will be allocated to another seat of the third license. As a result of the allocation, the number of license seats available is decremented and the number of installations outstanding is decremented. The third license now has 6 potential license seats (decremented from 7) and the second product now has 8 outstanding installations (decremented from 9).

This process may continue, as shown in Table (1) below, until both the first product and the second product are fully licensed. In this example, the second license will be under-utilized because it has one seat remaining. This may be a desired result, because it provides the flexibility of being able to install another instance of either the first product or the second product. For convenience, P1 and P2 respectively denote the first product and the second product and CP1 and CP2 respectively denote the degree of constraint for the first product and the second product in Table (1). Similarly, L1, L2 and L3 respectively denote the first license, second license and third license in Table (1). The checkmarks in Table (1) indicate the most constrained product (either by outright calculation or by arbitrary tie-breaker).

TABLE (1)

| Iteration | P1 | P2 | L1 | L2 | L3 | CP1 | CP2 |
|---|---|---|---|---|---|---|---|
| 1 | 12 | 10 | 10 | 5 | 8 | 0.800✓ | 0.769 |
| 2 | 11 | 10 | 9 | 5 | 8 | 0.786✓ | 0.769 |
| 3 | 10 | 10 | 8 | 5 | 8 | 0.769✓ | 0.769 |
| 4 | 9 | 10 | 7 | 5 | 8 | 0.750 | 0.769✓ |
| 5 | 9 | 9 | 7 | 5 | 7 | 0.750 | 0.750✓ |
| 6 | 9 | 8 | 7 | 5 | 6 | 0.750✓ | 0.727 |
| 7 | 8 | 8 | 6 | 5 | 6 | 0.727✓ | 0.727 |
| 8 | 7 | 8 | 5 | 5 | 6 | 0.700 | 0.727✓ |
| 9 | 7 | 7 | 5 | 5 | 5 | 0.700 | 0.700✓ |
| 10 | 7 | 6 | 5 | 5 | 4 | 0.700✓ | 0.667 |
| 11 | 6 | 6 | 4 | 5 | 4 | 0.667✓ | 0.667 |
| 12 | 5 | 6 | 3 | 5 | 4 | 0.625 | 0.667✓ |
| 13 | 5 | 5 | 3 | 5 | 3 | 0.625 | 0.625✓ |
| 14 | 5 | 4 | 3 | 5 | 2 | 0.625✓ | 0.571 |
| 15 | 4 | 4 | 2 | 5 | 2 | 0.571✓ | 0.571 |
| 16 | 3 | 4 | 1 | 5 | 2 | 0.500 | 0.571✓ |
| 17 | 3 | 3 | 1 | 5 | 1 | 0.500 | 0.500✓ |
| 18 | 3 | 2 | 1 | 5 | 0 | 0.500✓ | 0.400 |
| 19 | 2 | 2 | 0 | 5 | 0 | 0.400✓ | 0.400 |
| 20 | 1 | 2 | 0 | 4 | 0 | 0.250 | 0.500✓ |
| 21 | 1 | 1 | 0 | 3 | 0 | 0.333 | 0.333✓ |
| 22 | 1 | 0 | 0 | 2 | 0 | 0.500✓ | 0.000 |
| 23 | 0 | 0 | 0 | 1 | 0 | 0.000 | 0.000 |

It should be noted that the termination of the iterations may occur when either of the following conditions arise: (1) all products are fully licensed (there are no more unlicensed installations, as occurred in the above example), or (2) all licenses are consumed (there are no more seats from any license that can be consumed by a constrained product)—such a condition may be detected by a 0 (zero) in the denominator of the degree-of-constraint fraction, which may be treated as an infinite degree of constraint.

In this example, the following license-seat allocations were made. The first product received 10 seats from the first license and 2 seats from the second license. The second product received 8 seats from the third license and 2 seats from the second license. As a result of the allocation the second license has one remaining (unused) seat.

In one configuration, as in this example, one product instance may be allocated to one license seat per iteration (e.g., allocation). In another configuration, more than one product instances may be allocated to one or more licenses per iteration. In yet another configuration, more than one product may be allocated to one or more licenses per iteration.

It should be noted that a different scheme for allocating (e.g., consuming) the licenses might have produced different results, including under-licensed products and/or under-utilized licenses. For example, consider the effect of using a different allocation method for the example provided above. In this example, the first product is allocated 7 seats from the first license and 5 seats from the second license. This allocation allows the first product to be fully licensed. However, the second product could only be allocated the 8 seats from the third license. Therefore, the second product is under-licensed by 2 seats, while the first license is under-utilized by 3 seats. Therefore, a different scheme for allocating the licenses may result in non-compliance.

The systems and methods described herein may be applied to license compliance calculations. The systems and methods described herein may also be applied to a broader class of problems involving allocations of finite resources among entities related by many-to-many associations. For example, an engineering company may produce multiple products. The production of each product may require a different set of expertise, and each engineer is disciplined with different areas of expertise. In this example the engineer may be analogous to a license and production of each product may be analogous to a product. Thus, the most constrained production of a product may be allocated to the least valuable applicable engineer. Therefore, the systems and methods described herein may be applied toward the goal of improving the allocation of products that need to be produced to the available engineering staff.

Other solutions for achieving the systems and methods disclosed herein have been considered. In one such earlier solution, the user had to manually define the prioritizations of the licenses to be used and manually define under what circumstances (how many of the available seats could be applied to various products) the allocation could be made. Such prioritizations were static. In another such solution, there was an artificial limit of products that could be associated with any given license.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a computing device 102 in which systems and methods for allocating products 108 to licenses 114 may be implemented. The computing device 102 may include a memory 104, a sorting block/module 120, an allocating block/module 130, an operation block/module 134, an input device 138 and/or an output device 140. Examples of the computing device 102 include desktop computers, laptop computers, servers, supercomputers, tablet devices, cellular phones, smartphones, gaming systems and any other computing device. As used herein, a "block/module" may be implemented in hardware, software or a combination of both.

The memory 104 may be used to store data used by the computing device 102. The memory 104 may contain product data 106 and/or license data 112. Examples of the memory 104 include dynamic random access memory (DRAM), static random access memory (SRAM), flash memory, hard disks, floppy disks, magnetic tapes, optical disks and any other data storage medium. In one configuration, the memory 104 may be directly coupled and/or indirectly coupled to each component of the computing device 102.

The product data 106 may be used to identify one or more products 108a. Examples of the product 108 include software, firmware and/or hardware, etc. For instance, a product 108 may be or may represent a program (e.g., Microsoft Word, Excel, PowerPoint, Access, Internet Explorer, Windows Media Player, Windows, Apple iTunes, OS X, etc.), firmware and/or hardware (e.g., sound card, video card, display, network card, printer, projector, processor, memory (e.g., Random Access Memory (RAM), hard drive storage, etc.), removable memory/storage, etc.). For ease of discussion, product 108 may refer to the product and/or a product identifier that identifies the product. In one configuration, the product 108 may be a string of characters that identifies the product 108. For example, the product 108 may refer to the identifying string "Microsoft Office 2010". The product 108 may include (data representing) an instance count 110. The instance count 110 may be used to identify the number of instances of a product 108 that are installed. For example, if each managed computing device in a network of 10 managed computing devices had Microsoft Office 2010 installed, then the instance count 110 for Microsoft Office 2010 may be 10. In some configurations, the product data 106 may include additional information about the product 108. For example, the installation date and/or usage statistics for each instance 110 of a product 108. Product data 106 may be stored on the computing device 102 and/or received from some external source, such as a network, from the input device 138 (e.g., from a user) and/or from an external drive, etc.

The license data 112 may include data about one or more licenses 114a. A license 114 may govern the use and/or redistribution of a product 108 (e.g., cover a product 108). As used herein, the term "covered" may mean that a license 114 is applicable to a product 108 and/or that a license 114 may be allocated to a product 108. In one configuration, a license 114 may cover more than one product 108. Similarly, a product 108 may be covered by more than one license 114. For example, the license data 112 may include an original equipment manufacturer (OEM) license 114 for covering a single product 108 (e.g., Microsoft Office Professional 2010). In another example, the license data 112 may include a volume license 114 with downgrade rights (e.g., Microsoft Office Enterprise 2010) that may cover multiple products 108 (e.g., Microsoft Office Enterprise 2010, Microsoft Office Enterprise 2007). For ease of discussion, license 114 may refer to the license 114 and/or a license identifier 114 that identifies the license 114. In one configuration, the license 114 may be a string of characters that identifies the license 114. For example, the license 114 may refer to the identifying string "Microsoft Windows 7 Enterprise".

The license 114 may include one or more seats 116a and/or one or more product designations 118. The number of seats 116a that a license 114 includes defines the number of products 108 that may be covered by the license 114. For example, a license 114 with 1 seat 116a can cover at most 1 product 108 at any given time. Similarly, a license 114 with 5 seats 116a can cover at most 5 products 108 at any given time. The one or more product designations 118 define the products 108 that are covered by the license 114. Thus, a license 114 may only cover the number of products 108 that it contains a seat 116 for and that are designated by the one or more product designations 118. For example, a license 114 may include a product designation 118 for Microsoft Office 2010, a product designation 118 for Microsoft Office 2007 and 5 seats 116. Thus, this license 114 could cover any 5 products 108 that comprise any combination of Microsoft Office 2010 and Microsoft Office 2007. In one configuration, the license data 112 may include information about the duration (e.g., expiration) of a license 114. License data 112 may be stored on the computing device 102 and/or received from some external source, such as a network, from the input device 138 (e.g., from a user) and/or from an external drive, etc.

The sorting block/module 120 may be used to sort objects based on one or more criteria. In one configuration, the sorting block/module 120 may sort one or more licenses 114b into a group of sorted licenses 122. Examples of the group of sorted licenses 122 include arrays, lists, trees, hashes, stacks, queues, maps, etc. The sorting block/module 120 may sort the licenses 114b based on one or more criteria. In one configuration, the sorting block/module 120 may sort the licenses 114b based on the value 124 of each license 114b. For example, a license 114b may be sorted according to increasing value 124 (e.g., lowest value first, highest value last). In another example, a license 114b may be sorted according to decreasing value 124 (e.g., highest value first, lowest value last).

Each license 114b may include a value 124. The value 124 of a license 114b may be derived automatically and/or manually assigned based on one or more criteria. Any of a number of different criteria may be used to determine the value 124 of a license 114b. Examples of a valuing criterion include price, ubiquity (e.g., how many different products to which it can be applied), number of seats 116 (e.g., how many seats 116 that the license 114 includes), length of remaining license period, opinion, etc. The valuing criteria may be predefined or dynamically determined.

The sorting block/module 120 may sort (e.g., rank) the one or more licenses 114 into a group of sorted licenses 122 based on the value 124 of each license 114b. For example, a first license 114 has 10 seats 116 that can cover a first product 108. A second license 114 has 5 seats 116 that can cover the first product 108 and a second product 108. A third license 114 has 8 seats 116 that can cover the second product 108. If the valuing criterion is ubiquity (e.g., the number of products 108 to which it can be applied), then the second license 114 is the most valuable license 114 because it may be applied to both the first product 108 and the second product 108. Under the criterion of ubiquity, the first license 114 and third license 114 may be of equal value because each license only covers a single product 108. In one instance, the first license 114 and the second license 114 may be arbitrarily assigned a value 124. In another instance, a second criterion may be used (e.g., number of seats 116). In this instance, the first license 114 may be valued lower because it includes more seats 116 than the third license 114. The resulting group of sorted licenses 122 may be ordered (e.g., lowest value first, highest value last) as the first license 114, the third license 114 and the second license 114.

In one configuration, a group of sorted licenses 122 may be formed for each product 108b. Applying the previous example to this scenario, the first product 108 may only be covered by the first license 114 and the second license 114. The sorting block/module 120 may sort the first license 114 and the second license 114 based on the value 124 of the first license 114 and the value 124 of the second license 114 (the value 124 being determined by the ubiquity criterion, for example) resulting in a group of sorted licenses 122 for the first product 108 that is ordered (e.g., lowest value first, highest value last) as the first license 114 and the second license 114. Similarly, the second product 108 may only be covered by the second license 114 and the third license 114. The sorting block/module 120 may sort the second license 114 and the third license 114 based on the value 124 of the second license 114 and the value 124 of the third license 114 (the value 124 being determined by the ubiquity criterion, for example) resulting in a group of sorted licenses 122 for the second product 108 that is ordered (e.g., lowest value first, highest value last) as the third license 114 and the second license 114.

In one configuration, the one or more groups of sorted licenses 122 or information about the one or more groups of sorted licenses 122 may be made available to the allocating block/module 130. For example, when the sorting block/module 120 includes a group of sorted licenses 122 for each product 108, then the allocating block/module 130 may only need the first item in the group of sorted licenses 122 (e.g., if the lowest-valued license 114 is desired and the group of sorted licenses 122 is ordered lowest value first, highest value last). In some configurations, where the group of sorted licenses 122 is sorted differently (e.g., highest value first, lowest value last), then the allocating block/module 130 may only need the last item in the group of sorted licenses 122. Additionally or alternatively, the group of sorted licenses 122 may be stored in memory 104 for future use by the computing device 102 and/or other programs/devices.

In another configuration, the sorting block/module 120 may sort one or more products 108b into a group of sorted products 126. Examples of the group of sorted products 126 include arrays, lists, trees, hashes, stacks, queues, maps, etc. The sorting block/module 120 may sort the products 108b based on a degree of constraint 128. The degree of constraint 128 may be a measure of the how constrained a product 108b may be. For example, the degree of constraint 128 may be determined by performing a constraint calculation. For instance, the degree of constraint 128 may be determined by dividing the instance count 110 for a product 108b by the number of license 114 seats 116 that are available for that product 108b (from all of the potentially covering licenses 114). In this scenario, the largest degree of constraint 128 may represent the most-constrained product 108. In another example, the degree of constraint 128 may be determined by inverting the constraint calculation. For instance, the degree of constraint 128 may be determined by dividing the number of license 114 seats 116 that are available for a product 108b (from all of the potentially covering licenses 114) by the instance count 110 for that product 108b. In this scenario, the smallest degree of constraint 128 may represent the most-constrained product 108. These examples are merely exemplary of possible formulations of the constraint calculation. The constraint calculation may include any combination of mathematical and/or logical operations and may be based on any additional and/or alternative parameters.

The degree of constraint 128 may be determined for each product 108b. In one configuration, the sorting block/module 120 may determine the degree of constraint 128 for a product 108b and then sort (e.g., rank) the product 108b based on the degree of constraint 128. For example, a product 108b may be sorted by comparing two or more degrees of constraint 128. In the case where the largest degree of constraint 128 is the most-constrained product 108, a product 108b may be sorted according to decreasing degree of constraint 128 (e.g., highest degree of constraint first, lowest degree of constraint last). In the case where the smallest degree of constraint 128 is the most-constrained product 108, a product 108b may be sorted according to increasing degree of constraint 128 (e.g., lowest degree of constraint first, highest degree of constraint last). The degree of constraint 128 may be determined dynamically. In one configuration, the degree of constraint 128 may be determined dynamically upon any change in the parameters that determine the degree of constraint 128. The sorting block/module 120 may sort the one or more products 108 into a group of sorted products 126 based on the degree of constraint 128 of each product 108b.

For example, there are 12 instances of a first product 108 and 10 instances of a second product 108. A first license 114 has 10 seats 116 that can cover the first product 108, a second license 114 that has 5 seats 116 that can cover the first product 108 and the second product 108 and a third license 114 that has 8 seats 116 that can cover the second product 108. If the degree of constraint 128 is determined by dividing the instance count 110 for a product 108 by the number of license 114 seats 116 that are available for that product 108, then the degree of constraint 128 for the first product 108 is 12 installations/15 seats (10 from the first license 114 and 5 from the second license 114)=0.800. The degree of constraint 128 for the second product 108 is 10 installations/13 seats (8 from the third license 114 and 5 from the second license 114)=0.769.

In this example, the first product 108 has a higher degree of constraint 128 than the second product 108. If the sorting block/module 120 is sorting based on highest degree of constraint first and lowest degree of constraint last, then the sorting block/module 120 may sort the first product 108 higher than the second product 108. This sorting may result in a group of sorted products 126 that is ordered as the first product 108 and the second product 108. In one configuration, the one or more groups or information about the one or more groups of sorted products 126 may be made available to the allocating block/module 130. Additionally or alternatively, the group of sorted licenses 122 may be stored in memory 104 for future use by the computing device 102 and/or any other programs/devices.

The allocating block/module 130 may be used to make an allocation 132 of a product 108c to a seat 116b. The allocation 132 may be based on the degree of constraint 128 of a product 108 and/or the value 124 of a license 114. For example, the allocating block/module 130 may make an allocation 132 of the most-constrained product 108c to a seat 116b of the lowest-valued applicable license 114.

Continuing the example from above, the first product 108 was determined by the sorting block/module 120 to have the highest degree of constraint 128. Therefore, the first product 108 may be the most-constrained product 108. As a result of being the most-constrained product 108, the first product 108 may be the first item in the group of sorted products 126. Because the first product 108 may only be covered by either the first license 114 or the second license 114 then the lowest-valued applicable license 114 will be the lowest-valued license 114 between the first license 114 and the second license 114. The first license 114 was determined by the sorting block/module 120 to have the lowest value 124 of all of the licenses 114. Therefore, the first license 114 may be the lowest-valued applicable license 114 and may be the first item in the group of sorted licenses 122. In this scenario, an allocation 132 may be made between the first product 108c and a seat 116b of the first license 114.

The first license 114 does not cover the second product 108. Therefore, the first license 114 may not be considered in determining the lowest-valued license 114 for the second product 108. Both the second license 114 and the third license 114 may cover the second product 108. The third license 114 was determined by the sorting block/module 120 to have the lowest value 124 between the second license 114 and the third license 114. Therefore, the third license 114 may be the lowest-value applicable license 114 for the second product 108. In this scenario, an allocation 132 may be made allocating the second product 108c to a seat 116b of the third license 114.

In one configuration, the allocating block/module 130 may make allocations 132 dynamically based on the most-constrained product 108 and the lowest-valued applicable license 114. For example, the allocating block/module 130 may make an allocation 132 every time a product 108c and seat 116c of a license 114 is made available to it. The allocations 132 may be recorded and/or stored in memory 104 for use by the computing device 102 and/or any other programs/devices.

The operation block/module 134 may be used for performing an operation based on the one or more allocations 132. Examples of performing an operation based on an allocation 132 include sending licenses to other computing devices, notifying users of other computing devices to use a particular license 114, revoking a license 114, distributing a license 114, ordering more licenses 114, performing a compliance calculation 136, generating a compliance report based on the compliance calculation 136, sending a message based on allocation 132 information, outputting information to an output device 140, et cetera. The compliance calculation 136 may determine if the products 108 are properly and/or adequately licensed 114.

The input device 138 may be used to receive input. Examples of input devices 138 include keyboards, mice, cameras, touch screens, microphones, etc. For instance, a user may use an input device 138 to interact with the product data 106, the license data 112 and the function of the computing device 102. In one configuration, an input device 138 may be used to input the license data 112. In another configuration, program settings may be used to direct the function of the computing device 102. For example, the input device 138 may direct the operation block/module 134 to output the results of a compliance calculation 136 to an output device 140.

The output device 140 may be used to output the results of the operation block/module 134. In one configuration, the operation block/module 134 may output the result of a compliance calculation 136. In another configuration, the operation block/module 134 may send one or more allocations 132 to the output device 140 to be stored or displayed for a user.

It should be noted that one or more of the elements or components included in the computing device 102 may be implemented in hardware, software or a combination of both. Additionally or alternatively, the term "block/module" may be used to indicate that an element or component may be implemented in hardware, software or a combination of both.

Figure 2:
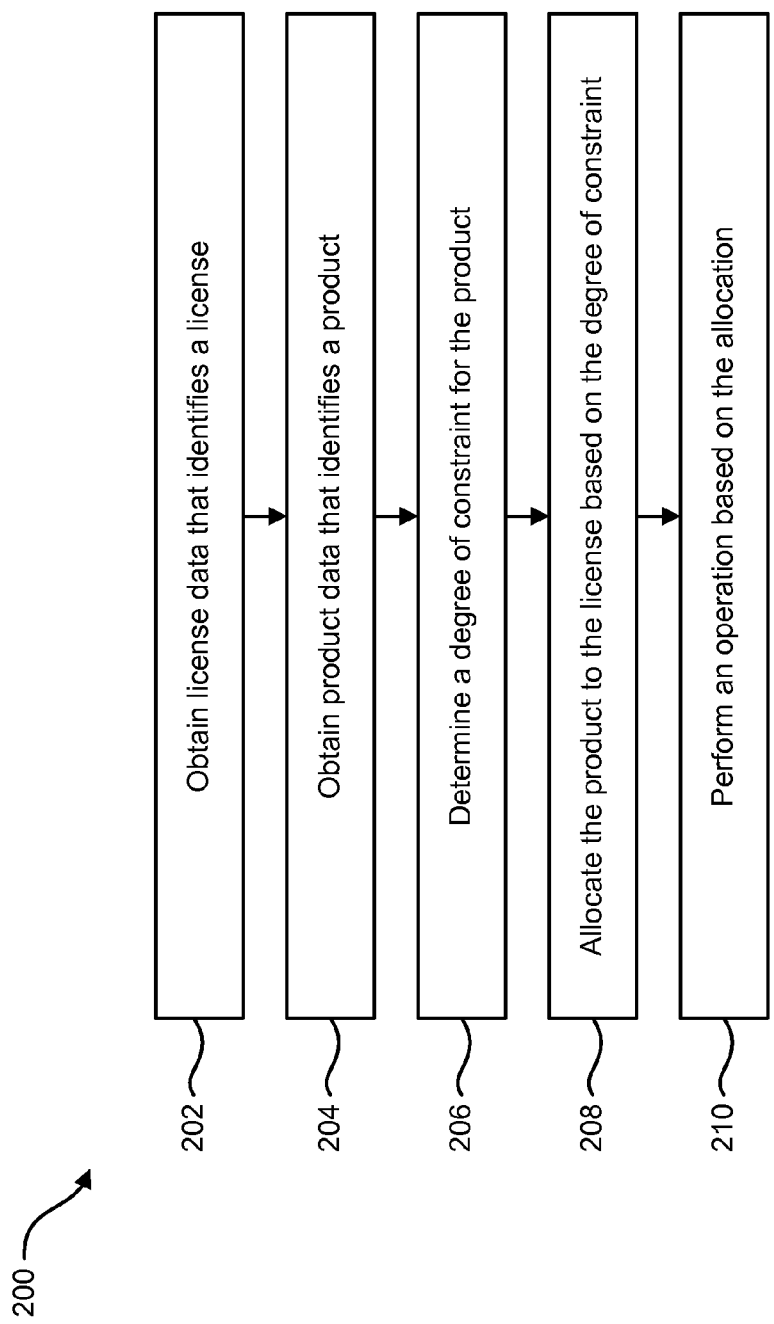
FIG. 2 is a flow diagram illustrating one configuration of a method for allocating products to licenses on a computing device.

FIG. 2 is a flow diagram illustrating one configuration of a method 200 for allocating products 108 to licenses 114 on a computing device 102. A computing device 102 may obtain 202 license data 112 that identifies a license 114. For example, the computing device 102 may obtain 202 the license data 112 from a file (e.g., list, table, database, document, computer file, etc.), user input (e.g., computer, mouse, scan), network communications, etc. For instance, a file containing a license 114, the number of seats 116 that a license 114 includes and/or the product designations 118 of a license 114 may be received from external media and stored in computing device 102 memory 104. License data 112 may be additionally or alternatively obtained 202 over a network (e.g., Local Area Network (LAN), the Internet, etc.) of computing devices. Additionally or alternatively, the computing device 102 may receive user input including license data 112. In one configuration, the license data 112 may be obtained 202 (e.g., updated) upon the occurrence of an event (e.g., the purchase of a new license 114, expiration of a current license 114, etc.).

The computing device 102 may obtain 204 product data 106 that identifies a product 108. For example, the computing device 102 may obtain 204 the product data 106 from a file (e.g., list, table, database, document, computer file, etc.), user input (e.g., computer, mouse, scan), network communications, etc. For instance, a file containing product data 106 may be received from external media and stored in the memory 104 of the computing device 102. In one configuration, a database may contain an inventory report from a network of managed computing devices that includes the list of products 108 that are installed and the number of instances 110 (e.g., installations) of each product 108 there are. The product data 106 may be additionally or alternatively obtained 204 over a network (e.g., Local Area Network (LAN), the Internet, etc.) of computing devices. In one configuration, each computing device in a network of computing devices communicates their specific product data 106 specific to the computing device 102. Additionally or alternatively, the computing device 102 may receive user input including product data 106.

The computing device 102 may determine 206 the degree of constraint 128 for the product 108. The degree of constraint 128 may be a measure of the how constrained a product 108b may be. For instance, the degree of constraint 128 may be determined 206 by dividing the instance count 110 for a product 108b by the number of license 114 seats 116 that are available for that product 108b (from all of the potentially covering licenses 114). In another instance, the degree of constraint 128 may be determined 206 by dividing the number of license 114 seats 116 that are available for a product 108b (from all of the potentially covering licenses 114) by the instance count 110 for that product 108b. In either of these scenarios, the degree of constraint 128 may be computed from known data, the number of instances 110 of a product 108 and the number of potential seats 116 in all of the potential licenses 114. In some configurations, the degree of constraint 128 may be determined 206 using different parameters. In one example, the computing device 102 may determine 206 the degree of constraint 128 for a product 108 to determine the most-constrained product 108. In this scenario, the degree of constraint 128 may be determined 206 for each product 108 so that a determination may be made as to which product 108 is the most-constrained product 108.

The computing device 102 may allocate 208 a product 108 to a license 114 based on the degree of constraint 128. For example, the computing device 102 may allocate 208 the most-constrained product 108 to a license 114. In this scenario, the computing device 102 may allocate 208 the most-constrained product 108 to a license 114 by making an allocation 132 of the most-constrained product 108b to an open seat 116 of a license 114. In one configuration, the allocation 208 may be an assignment of product instances 110 to seats 116 of a license 114. In some configurations, the computing device 102 may allocate 208 a product 108 to a license 114 based on additional or alternative criteria to the degree of constraint 128.

The computing device 102 may perform 210 an operation based on the allocation 132. For example, the computing device 102 may perform 210 a compliance calculation 136 based on the allocations 132. For instance, the computing device 102 may perform 210 a compliance calculation 136 to determine whether the product licensing environment is compliant and/or determine the excess/needs of the product licensing environment. In one configuration, the computing device 102 may automatically perform 210 a compliance calculation 136 based on one or more allocations 132. In another configuration, the computing device 102 may receive a command from the input device 138 to perform 210 a compliance calculation 136 based on a specific allocation 132.

Additionally or alternatively, the computing device 102 may perform 210 other operations using the allocations 132. For example, the allocations 132 may be stored in a storage medium for future access. In another example, some or all of the allocations 132 may be output by an output device 140. For instance, one or more allocations 132 may be output to a display to be displayed to a user. In another instance, one or more allocations 132 may be output for transmission elsewhere. For example, the allocations 132 may be transferred to another computing device 102, to a storage device, to a software program, etc. In one configuration, the computing device 102 may output the results of a compliance calculation 136 for display to a user and/or for storage in a medium that can be preserved for future access. In another configuration, the computing device 102 may provide a message indicating whether or not the product licensing environment is compliant.

The method 200 and/or one or more of the described procedures of method 200 may be repeated. For example, one or more of the described procedures may be repeated until all of the products 108 are licensed or all of the licenses 114 are consumed. In one instance, the computing device 102 may repeat determining 206 a degree of constraint 128 for a product 108 until the degree of constraint 128 for every product 108 has been determined 206. In another instance, the computing device 102 may repeat determining 206 and allocating 208 until all of the products 108 are licensed or all of the licenses 114 are consumed.

Figure 3:
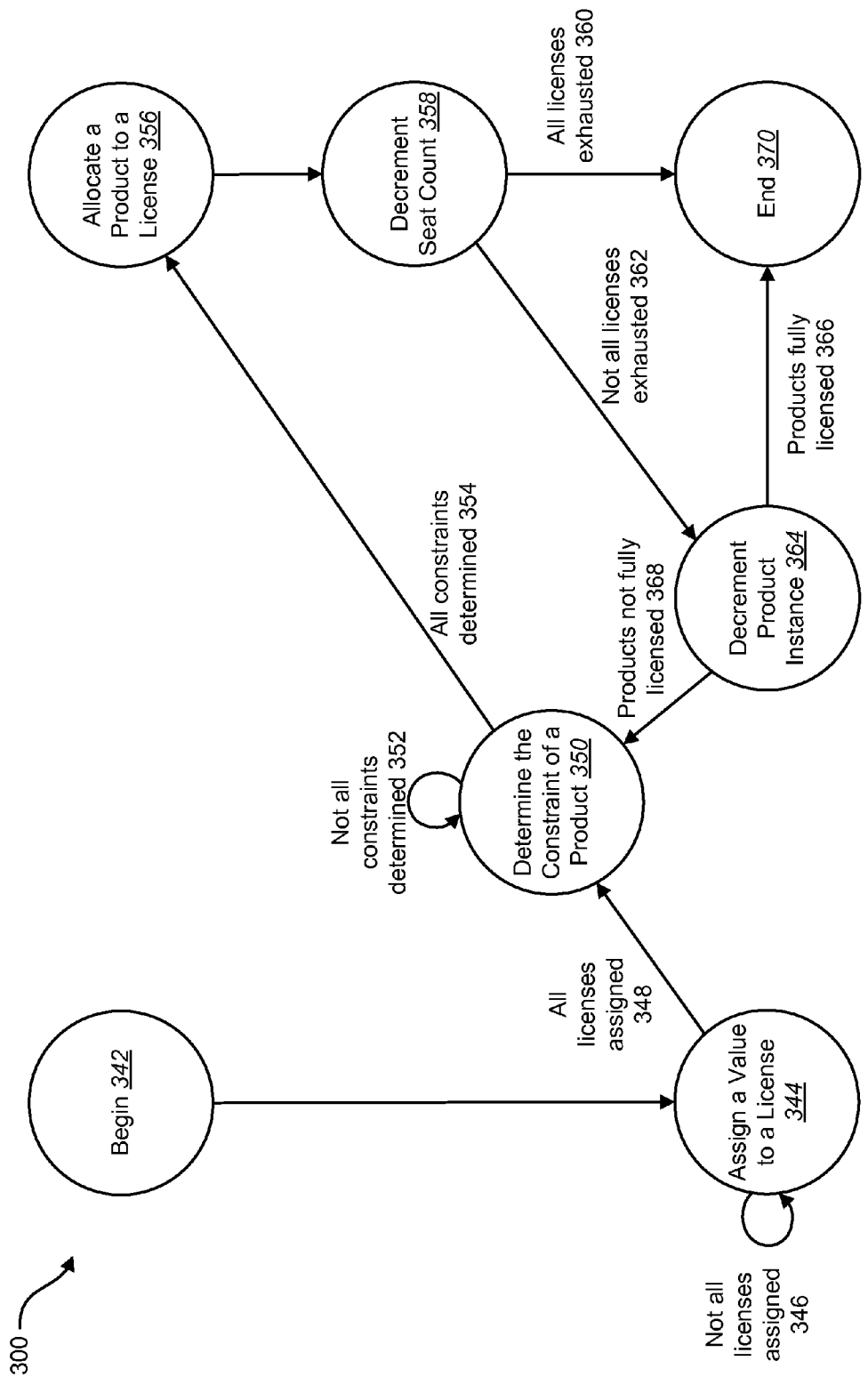
FIG. 3 is a state diagram that illustrates an approach for allocating products to licenses.

FIG. 3 is a state diagram 300 that illustrates an approach for allocating products to licenses. The computing device 102 begins 342 by assigning a value to a license 344. Once all of the licenses have been assigned a value 348, the computing device 102 may determine the constraint of a product 350. Once all of the constraints have been determined 354, the computing device 102 may allocate a product to a license 356. At this point, the seat count may be decremented 358 and the number of product instances may be decremented 364. If not all of the licenses are exhausted 362 and the products are not fully licensed 368, then the computing device 102 may iterate through another allocation cycle by determining the constraint of a product 350. Several iterations may occur until all of the licenses are exhausted 360 or all of the products are fully licensed 366. Upon either of these conditions, the computing device 102 may end 370 operation.

To help illustrate the approach illustrated in state diagram 300, the following example may be used. In a product licensing scenario, there may be a group of licenses 114 that cover a group of product 108 instances (e.g., installations). A first license 114 may have 10 seats 116 that may cover a first product 108. A second license 114 may have 5 seats 116 that may cover the first product 108 and a second product 108. A third license 114 may have 8 seats 116 that may cover the second product 108. In this product licensing scenario, there may be 12 instances of the first product 108 and 10 instances of the second product 108.

The computing device 102 may begin 342 by assigning a value to a license 344. For example, a value 124 may be assigned based on any of a number of valuing criteria. Examples of a valuing criterion include price, ubiquity (e.g., the number of products to which it can be applied), length of remaining license period, opinion, etc. Based on the valuing criterion or valuing criteria that is used, a value 124 may be assigned to the license 114. For example, a first value 124 may be assigned to the first license 114. If the valuing criterion is ubiquity, then the first license 114 may be given a value 124 of 1 because the first license 114 only includes 1 product designation 118 (e.g., only covers 1 product 108). Once a value has been assigned to a license 344, the computing device 102 may determine if all of the licenses have been assigned a value (e.g., 346, 348). If not all of the licenses have been assigned 346, then the computing device 102 assigns a value to another license 344.

Once all of the licenses have been assigned a value 348, the approach continues by determining the constraint of a product 350. In one configuration, the degree of constraint 128 may be calculated as the fraction of (a) the number of product instances 110 (e.g., installations) needing license 114 seats 116, divided by (b) the number of license 114 seats 116 (from all potentially covering licenses 114) that could be applied to that product 108. For example, a first degree of constraint 128 may be determined for the first product 108. In this instance, there are 12 instances 110 of the first product 108 and 15 seats (10 from the first license 114 and 5 from the second license 114). Therefore, the degree of constraint 128 for the first product 108 will be 12 instances/15 seats=0.800. Once a constraint has been determined for a product 350, the computing device 102 may determine if all of the products have had a constraint determined (e.g., 352, 354). If not all of the products have had a constraint determined 352, then the computing device 102 determines the constraint of another product 350.

Once all of the constraints have been determined 354, the computing device 102 may allocate a product to a license 356. In one configuration, the allocation 132 of the product 108 to the seat 116 of a license 114 may be based on the degree of constraint 128 and/or the value 124 of a license 114. In one instance, the allocation 132 may be an allocation of the most-constrained product 108 (e.g., based on the degree of constraint 128) to the seat 116 of an applicable least-valued license 114 (e.g., based on the value 124 of the license 114). For example, it was determined that the degree of constraint 128 of the first product 108 was 0.800. If the degree of constraint 128 of the second product 108 is 0.769 and the first license 114 was determined to have the lowest value 124, then the computing device 102 may allocate the first product 108 (e.g., most-constrained product) to the first license 114 (e.g., least-valued applicable license). It may be noted that products 108 may only be allocated to licenses 114 that cover that product 108 (e.g., applicable licenses).

Once a product has been allocated to a license 356, the computing device 102 may decrement the seat count 358. The seat count may be decremented 358 to reflect the occupancy of a seat 116 as a result of the allocation of a product to a license 356. For example, the first license 114 was allocated an instance 110 of the first product 108. Therefore, a seat 116 of the first license 114 is now occupied by an instance 110 of the first product 108. Thus, there is one less seat 116 available for another instance 110 of a product 108. In this scenario, the seat count 116 for the first license 114 is decremented from 10 seats 116 to 9 seats 116 as a result of the allocation. If the computing device 102 determines that all of the licenses are exhausted 360 then the computing device 102 may end 370 operation.

Once the seat count has been decremented 358, the computing device 102 may decrement the number of product instances 364 (if not all licenses are exhausted 362). The number of product instances may be decremented 364 to reflect that 1 less product 108 instance 110 needs licensed as a result of the allocation of a product to a license 356. For example, an instance 110 of the first product 108 was allocated to a seat 116 of the first license 114. Therefore, 1 instance 110 of the first product 108 is now covered by a seat 116 of the first license 114. Thus, there is 1 less instance 110 of the first product 108 that needs covered by a license 114. If the computing device 102 determines that all of the products are fully licensed 366, then the computing device 102 may end 370 operation.

If not all of the licenses are exhausted 362 and the products are not fully licensed 368, then the computing device 102 may iterate through another allocation cycle by determining the constraint of a product 350. Several iterations may occur until either all of the licenses are exhausted 360 or all of the products are fully licensed 366 and the computing device 102 ends 370. Table (1) may illustrate the effect of the state diagram 300 for each iteration.

The computing device 102 may determine that all of the licenses are exhausted 360 when there are no more applicable license 114 seats 116 available. For example, this may occur when all of the seats 116 of all of the licenses 114 are occupied. In another example, all the licenses are exhausted when all of the instances 110 of products 108 that could possibly be allocated 132 to a seat 116 of a license 114 have been allocated and there are no applicable license 114 seats 116 available for the product 108 instances 110 that have not been allocated.

The computing device 102 may determine that not all of the licenses are exhausted 362 when there are remaining instances 110 of products 108 that may be allocated to. If the decrement of seats 116 for the first license 114 is from 10 to 9, then there are still 9 license 114 seats 116 available. Thus, the decrement of the seat count 358 does not exhaust all of the licenses 362.

The computing device 102 may determine that all of the products are fully licensed 366 when all of the instances 110 of all of the products 108 are covered by seats 116 of appropriate licenses 114.

The computing device 102 may determine that all of the products are not fully licensed 368 when there remains one or more instances 110 of one or more products 108 that may be allocated to at least one open applicable license 114 seat 116. For example, the decrement of the instances 110 of the first product 108 from 12 instances 110 to 11 instances 110 does not result in the first product 108 being fully licensed. At this point, there are still 11 instances 110 of the first product that are not licensed and 10 instances 110 of the second product 108 that are not licensed.

Figure 4:
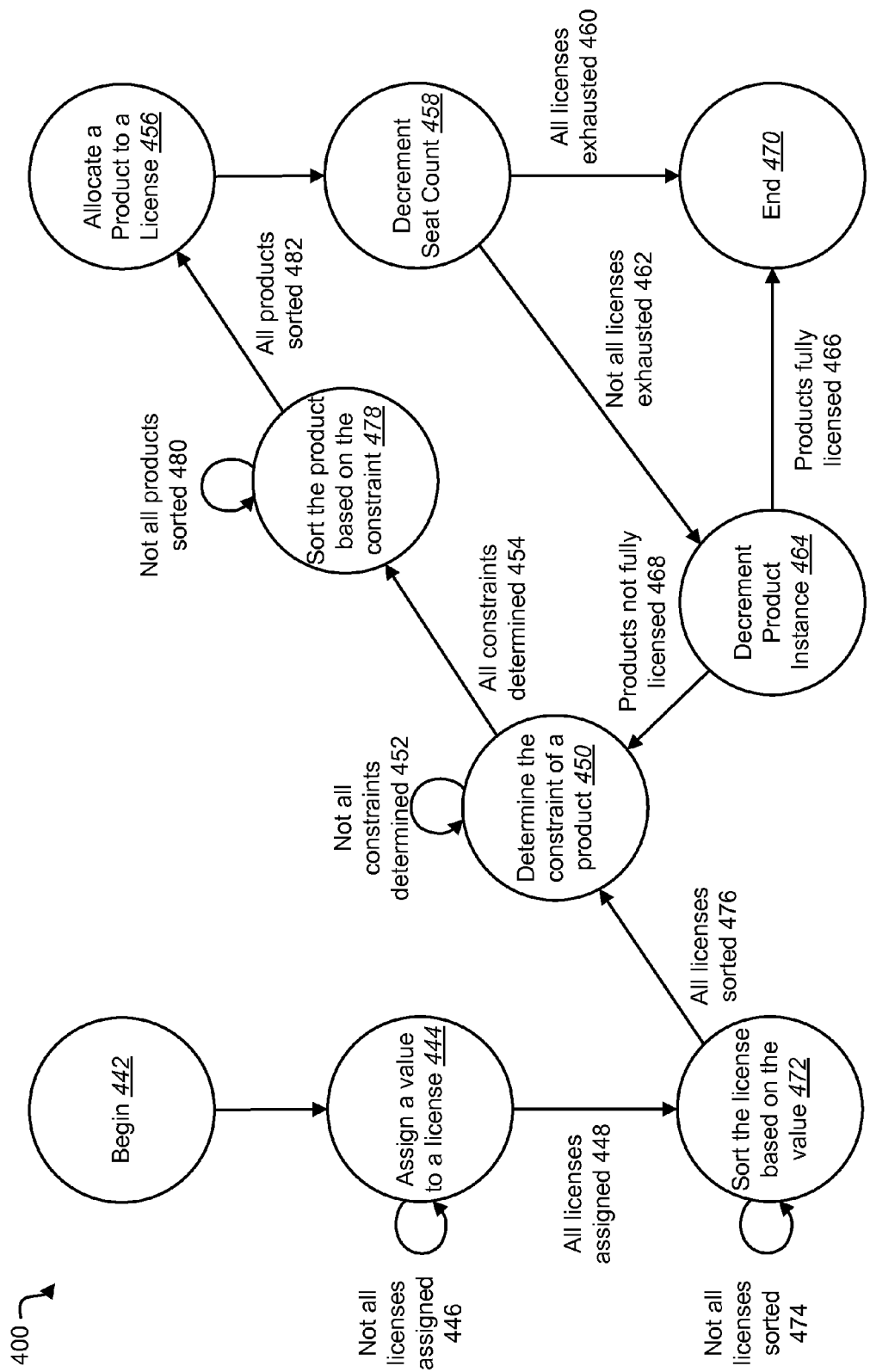
FIG. 4 is a state diagram that illustrates a more specific approach for allocating products to licenses.

FIG. 4 is a state diagram 400 that illustrates a more specific approach for allocating products to licenses. The computing device 102 begins 442 by assigning a value to a license 444. Once all of the licenses have been assigned a value 448, the computing device 102 may sort the licenses based on the value 472. Once all of the licenses have been sorted 476, the computing device 102 may determine the constraint of a product 450. Once all of the constraints have been determined 454, the computing device 102 may sort the products based on the constraint 478. Once all the products have been sorted 482, the computing device 102 may allocate a product to a license 456. At this point, the seat count may be decremented 458 and the number of product instances may be decremented 464. If not all of the licenses are exhausted 462 and the products are not fully licensed 468, then the computing device 102 may iterate through another allocation cycle by determining the constraint of a product 450. Several iterations may occur until all of the licenses are exhausted 460 or all of the products are fully licensed 466. Upon either of these conditions, the computing device 102 may end 470 operation.

To help illustrate the approach illustrated in state diagram 400, the following example may be used. In a product licensing scenario, there may be a group of licenses 114 that cover a group of product 108 instances (e.g., installations). A first license 114 may have 10 seats 116 that may cover a first product 108. A second license 114 may have 5 seats 116 that may cover the first product 108 and a second product 108. A third license 114 may have 8 seats 116 that may cover the second product 108. In this product licensing scenario, there may be 12 instances of the first product 108 and 10 instances of the second product 108.

The computing device 102 may begin 442 by assigning a value to a license 444. For example, a value 124 may be assigned based on any of a number of valuing criteria. Examples of a valuing criterion include price, ubiquity (e.g., the number of products to which it can be applied), length of remaining license period, opinion, etc. Based on the valuing criterion or valuing criteria that is used, a value 124 may be assigned to the license 114. For example, a first value 124 may be assigned to the first license 114. If the valuing criterion is ubiquity, then the first license 114 may be given a value 124 of 1 because the first license 114 only includes 1 product designation 118 (e.g., only covers 1 product 108). Once a value has been assigned to a license 444, the computing device 102 may determine if all of the licenses have been assigned a value (e.g., 446, 448). If not all of the licenses have been assigned 446, then the computing device 102 assigns a value to another license 444.

Once all of the licenses have been assigned a value 448, the computing device 102 may sort the licenses based on the value 472. For example, the licenses 114 may be sorted according to increasing value 124 (e.g., lowest value first, highest value last). For instance, the first license 114 may have a value 124 of 1, the second license 114 may have a value 124 of 3 and the third license 114 may have a value 124 of 2. In this case, the first license 114 may be sorted in a first position based on its low value 124. If not all of the licenses have been sorted 474, then the computing device 102 sorts another license based on the value 472 (e.g., sort the third license 114 in a second position and sort the second license 114 in a third position).

Once all of the licenses have been sorted 476, the approach continues by determining the constraint of a product 450. In one configuration, the degree of constraint 128 may be calculated as the fraction of (a) the number of product instances 110 (e.g., installations) needing license 114 seats 116, divided by (b) the number of license 114 seats 116 (from all potentially covering licenses 114) that could be applied to that product 108. For example, a first degree of constraint 128 may be determined for the first product 108. In this instance, there are 12 instances 110 of the first product 108 and 15 seats (10 from the first license 114 and 5 from the second license 114). Therefore, the degree of constraint 128 for the first product 108 will be 12 instances/15 seats=0.800. Once a constraint has been determined for a product 450, the computing device 102 may determine if all of the products have had a constraint determined (e.g., 452, 454). If not all of the products have had a constraint determined 452, then the computing device 102 determines the constraint of another product 450.

Once all of the constraints have been determined 454, the computing device 102 may sort the products based on the constraint 478. For example, the products 108 may be sorted according to decreasing degree of constraints 128 (e.g., highest value first, lowest value last). For instance, the first product 108 may have a degree of constraint 128 of 0.800 and the second product 108 may have a degree of constraint 128 of 0.769. In this case, the first product 108 may be sorted in a first position based on its high degree of constraint 128. If not all of the products have been sorted 480, then the computing device 102 sorts another product based on the constraint 478 (e.g., sort the second product 108 in a second position).

Once all of the products have been sorted 482, the computing device 102 may allocate a product to a license 456. In one configuration, the allocation 132 of the product 108 to the seat 116 of a license 114 may be based on the degree of constraint 128 and/or the value 124 of a license 114. In one instance, the allocation 132 may be an allocation of the most-constrained product 108 (e.g., based on the degree of constraint 128) to the seat 116 of an applicable least-valued license 114 (e.g., based on the value 124 of the license 114). For example, it was determined that the degree of constraint 128 of the first product 108 was 0.800. If the degree of constraint 128 of the second product 108 is 0.769 and the first license 114 was determined to have the lowest value 124, then the computing device 102 may allocate the first product 108 (e.g., most-constrained product) to the first license 114 (e.g., least-valued applicable license). It may be noted that products 108 may only be allocated to licenses 114 that cover that product 108 (e.g., applicable licenses).

Once a product has been allocated to a license 456, the computing device 102 may decrement the seat count 458. The seat count may be decremented 458 to reflect the occupancy of a seat 116 as a result of the allocation of a product to a license 456. For example, the first license 114 was allocated an instance 110 of the first product 108. Therefore, a seat 116 of the first license 114 is now occupied by an instance 110 of the first product 108. Thus, there is one less seat 116 available for another instance 110 of a product 108. In this scenario, the seat count 116 for the first license 114 is decremented from 10 seats 116 to 9 seats 116 as a result of the allocation. If the computing device 102 determines that all of the licenses are exhausted 460, then the computing device 102 may end 470 operation.

Once the seat count has been decremented 458, the computing device 102 may decrement the number of product instances 464. The number of product instances may be decremented 464 to reflect that 1 less product 108 instance 110 needs licensed as a result of the allocation of a product to a license 456. For example, an instance 110 of the first product 108 was allocated to a seat 116 of the first license 114. Therefore, 1 instance 110 of the first product 108 is now covered by a seat 116 of the first license 114. Thus, there is 1 less instance 110 of the first product 108 that needs covered by a license 114. If the computing device 102 determines that all of the products are fully licensed 466, then the computing device 102 may end 470 operation.

If not all of the licenses are exhausted 462 and the products are not fully licensed 468, then the computing device 102 may iterate through another allocation cycle by determining the constraint of a product 450. Several iterations may occur until either all of the licenses are exhausted 460 or all of the products are fully licensed 466 and the computing device 102 ends 470. Table (1) may illustrate the effect of the state diagram 400 for each iteration.

The computing device 102 may determine that all of the licenses are exhausted 460 when there are no more applicable license 114 seats 116 available. For example, all of the licenses are exhausted 460 when all of the seats 116 of all of the licenses 114 are occupied. In another example, all of the licenses are exhausted 460 when all of the instances 110 of products 108 that could possibly be allocated 132 to a seat 116 of a license 114 have been allocated and there are no applicable license 114 seats 116 available for the product 108 instances 110 that have not been allocated.

The computing device 102 may determine that not all of the licenses are exhausted 462 when there are remaining instances 110 of products 108 that may be allocated to. If the decrement of seats 116 for the first license 114 is from 10 to 9, then there are still 9 license 114 seats 116 available. Thus the decrement of the seat count 458 does not exhaust all of the licenses 462.

The computing device 102 may determine that all of the products are fully licensed 466 when all of the instances 110 of all of the products 108 are covered by seats 116 of appropriate licenses 114.

The computing device 102 may determine that all of the products are not fully licensed 468 when there remains one or more instances 110 of one or more products 108 that may be allocated to at least one open applicable license 114 seat 116. For example, the decrement of the instances 110 of the first product 108 from 12 instances 110 to 11 instances 110 does not result in the first product 108 being fully licensed. At this point, there are still 11 instances 110 of the first product that are not licensed and 10 instances 110 of the second product 108 that are not licensed.

Figure 5:
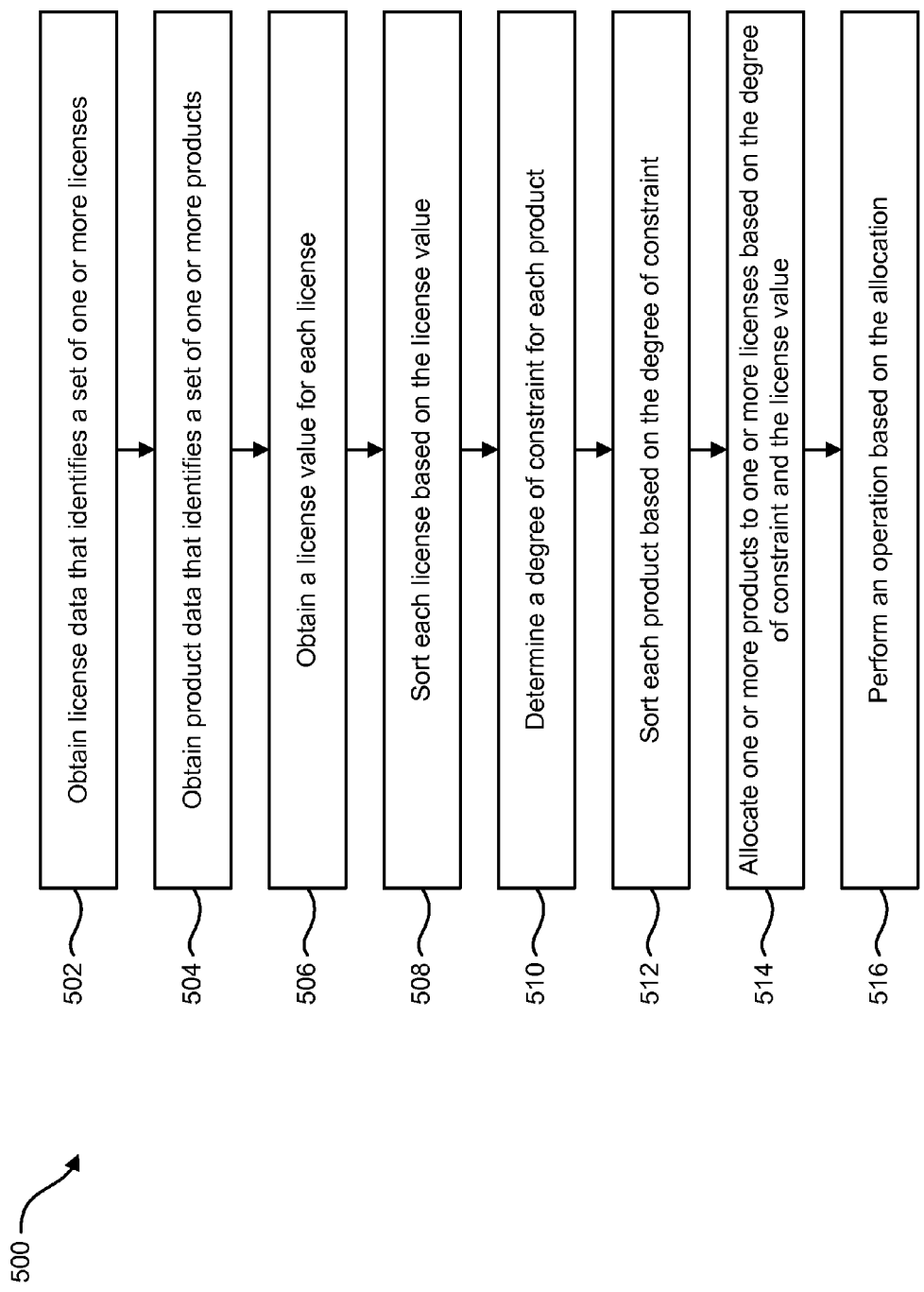
FIG. 5 is a flow diagram illustrating a more specific configuration of a method for allocating products to licenses on a computing device.

FIG. 5 is a flow diagram illustrating a more specific configuration of a method 500 for allocating products 108 to licenses 114 on a computing device 102. A computing device 102 may obtain 502 license data 112 that identifies a license 114. For example, the computing device 102 may obtain 502 the license data 112 from a file (e.g., list, table, database, document, computer file, etc.), user input (e.g., computer, mouse, scan), network communications, etc. For instance, a file containing a license 114, the number of seats 116 a license 114 includes and/or the product designations 118 of a license 114 may be received from external media and stored in computing device 102 memory 104. License data 112 may be additionally or alternatively obtained 502 over a network (e.g., Local Area Network (LAN), the Internet, etc.) of computing devices. Additionally or alternatively, the computing device 102 may receive user input including license data 112. In one configuration, the license data 112 may be obtained 502 (e.g., updated) upon the occurrence of an event (e.g., the purchase of a new license 114, expiration of a current license 114, etc.).

The computing device 102 may obtain 504 product data 106 that identifies a product 108. For example, the computing device 102 may obtain 504 the product data 106 from a file (e.g., list, table, database, document, computer file, etc.), user input (e.g., computer, mouse, scan), network communications, etc. For instance, a file containing product data 106 may be received from external media and stored in the memory 104 of the computing device 102. In one configuration, a database may contain an inventory report from a network of managed computing devices that includes the list of products 108 that are installed and the number of instances 110 (e.g., installations) of each product 108 there are. The product data 106 may be additionally or alternatively obtained 504 over a network (e.g., Local Area Network (LAN), the Internet, etc.) of computing devices. In one configuration, each computing device in a network of computing devices communicates their specific product data 106 specific to the computing device 102. Additionally or alternatively, the computing device 102 may receive user input including product data 106.

The computing device 102 may obtain 506 a license 114 value 124 for each license 114. For example, the computing device 102 may obtain 204 the license 114 value 124 from a file (e.g., list, table, database, document, computer file, etc.), user input (e.g., computer, mouse, scan), network communications, etc. For instance, a file containing a license 114 value 124 may be received from external media and stored in the memory 104 of the computing device 102. The license 114 value 124 may be additionally or alternatively obtained 506 over a network (e.g., Local Area Network (LAN), the Internet, etc.) of computing devices. Additionally or alternatively, the computing device 102 may receive user input including a license 114 value 124.

The computing device 102 may sort 508 each license 114 based on the license 114 value 124. In one configuration, the licenses 114 may be sorted 508 according to increasing value 124 (e.g., lowest value first, highest value last). For example, a first license 114 may have a value 124 of 1 and a second license 114 may have a value 124 of 2. In this case, the computing device 102 may sort 508 the first license 114 in a first position based on its low value 124 and sort the second license 114 in a second position based on its higher value 124. In another configuration, the licenses 114 may be sorted 508 according to a different methodology. In one configuration, the sorted licenses 114 may be a group of sorted licenses 122.

The computing device 102 may determine 510 the degree of constraint 128 for each product 108. The degree of constraint 128 may be a measure of the how constrained a product 108*b* may be. For instance, the degree of constraint 128 may be determined 510 by dividing the instance count 110 for a product 108*b* by the number of license 114 seats 116 that are available for that product 108*b* (from all of the potentially covering licenses 114). In another instance, the degree of constraint 128 may be determined 510 by dividing the number of license 114 seats 116 that are available for a product 108*b* (from all of the potentially covering licenses 114) by the instance count 110 for that product 108*b*. In either of these scenarios, the degree of constraint 128 may be computed from known data, the number of instances 110 of a product 108 and the number of potential seats 116 in all of the potential licenses 114. In some configurations, the degree of constraint 128 may be determined 510 using different parameters. For example, the computing device 102 may determine 510 the degree of constraint 128 for a product 108 to determine the most-constrained product 108. In this scenario, the degree of constraint 128 may be determined 510 for each product 108 so that a determination may be made as to which product 108 is the most-constrained product 108.

The computing device 102 may sort 512 each product 108 based on the degree of constraint 128. In one configuration, the products 108 may be sorted 512 according to decreasing degree of constraint 128 (e.g., highest value first, lowest value last). For example, a first product 108 may have a degree of constraint 128 of 0.800 and a second product 108 may have a degree of constraint 128 of 0.769. In this case, the computing device 102 may sort 512 the first product 108 in a first position based on its high degree of constraint 128 and sort the second product 108 in a second position based on its lower degree of constraint 128. In another configuration, the products 108 may be sorted 512 according to a different methodology. In one configuration, the sorted products 108 may be a group of sorted products 126.

The computing device 102 may allocate 514 one or more products 108 to one or more licenses 114 based on the degree of constraint 128. For example, the computing device 102 may allocate 514 the most-constrained product 108 to a least-valued license 114. In this scenario, the computing device 102 may allocate 514 the most-constrained product 108 to a least-valued license 114 by making an allocation 132 of the most-constrained product 108*b* to an open seat 116*c* of a license 114. In one configuration, the allocation 132 may be an assignment of one or more product instances 110 to one or more seats 116 of a license 114. In some configurations, the computing device 102 may allocate 514 a product 108 to a license 114 based on additional or alternative criteria to the degree of constraint 128. In one configuration, the computing device 102 may allocate 514 a product 108 to a license 114 by allocating the most-constrained product 108 from the group of sorted products 126 to the least-valued license 114 from the group of sorted licenses 122.

The computing device 102 may perform 516 an operation based on the allocation 132. For example, the computing device 102 may perform 516 a compliance calculation 136 based on the allocations 132. For instance, the computing device 102 may perform 516 a compliance calculation 136 to determine whether the product licensing environment is compliant and/or determine the excess/needs of product licensing environment. In one configuration, the computing device 102 may automatically perform 516 a compliance calculation 136 based on one or more allocations 132. In another configuration, the computing device 102 may receive a command from the input device 138 to perform 516 a compliance calculation 136 based on a specific allocation 132.

Additionally or alternatively, the computing device 102 may perform 516 other operations using the allocations 132. For example, the allocations 132 may be stored in a storage medium for future access. In another example, some or all of the allocations 132 may be output by an output device 140. For instance, one or more allocations 132 may be output to a display to be displayed to a user. In another instance, one or more allocations 132 may be output for transmission elsewhere. For example, the allocations 132 may be transferred to another computing device 102, to a storage device, to a software program, etc. In one configuration, the computing device 102 may output the results of a compliance calculation 136 for display to a user and/or for storage in a medium that can be preserved for future access.

The method 500 and/or one or more of the described procedures of method 500 may be repeated. For example, one or more of the described procedures may be repeated until all of the products 108 are licensed or all of the licenses 114 are consumed.

Figure 6:
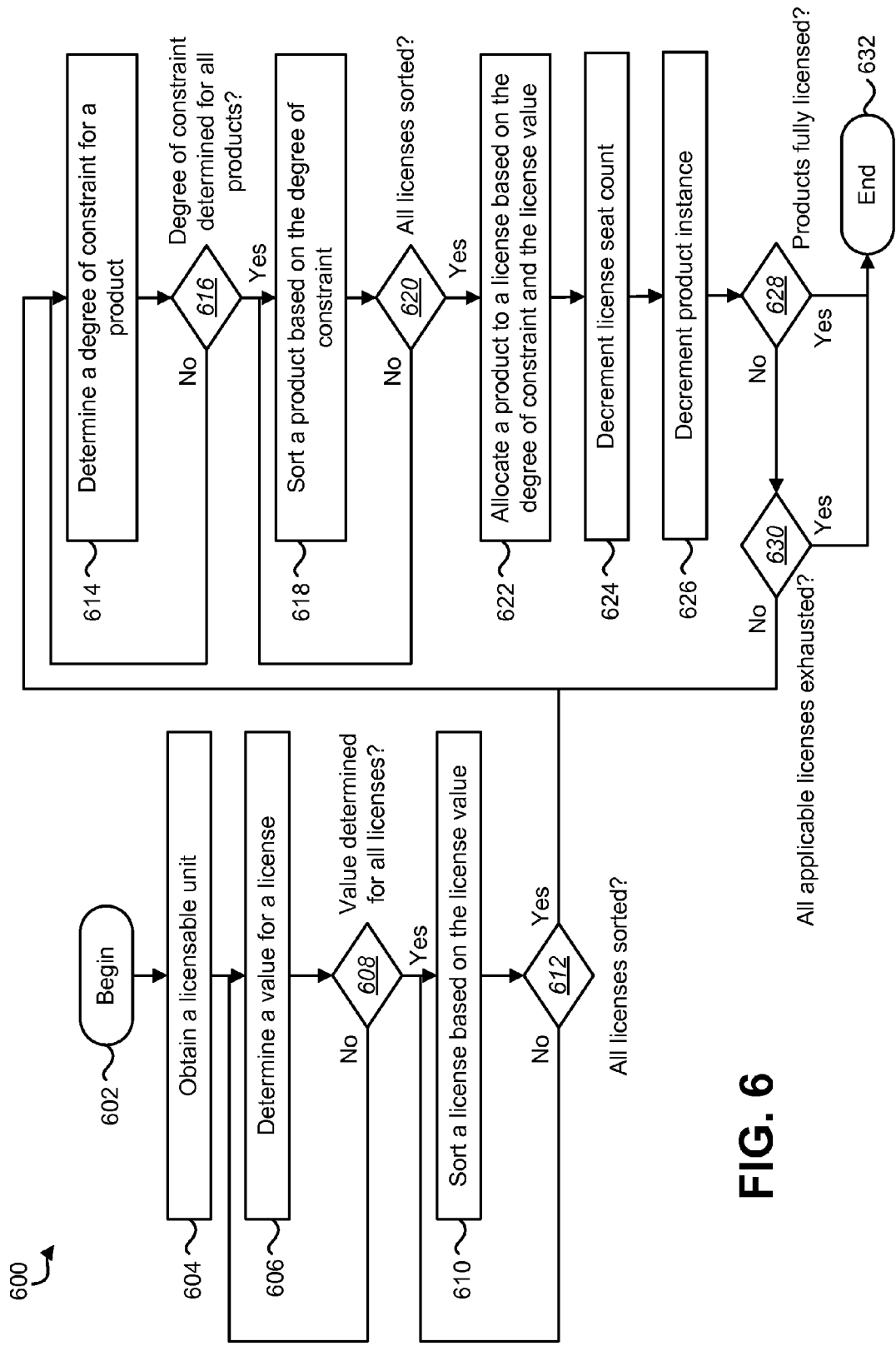
FIG. 6 is a flow diagram illustrating another more specific configuration of a method for allocating products to licenses on a computing device.

FIG. 6 is a flow diagram illustrating another more specific configuration of a method 600 for allocating products 108 to licenses 114 on a computing device 102. The computing device 102 may begin 602 allocating products 108 to licenses 114. The computing device 102 may obtain 604 a licensable unit. A licensable unit may be a group of related products 108 and/or related licenses 114, where the overlap of license 114 product designations 118 results in many-to-many relationship between products 108 and licenses 114. For example, a first license 114 may have 10 seats 116 that may cover a first product 108. A second license 114 may have 5 seats 116 that may cover the first product 108 and a second product 108. A third license 114 may have 8 seats 116 that may cover the second product 108. In this example, the first license 114, the second license 114 and the third license 114 are all related license 114 and the first product 108 and the second product 108 are related products 108. This group of related products 108 and related licenses 114 may be a licensable unit. Continuing with the example, there may be 12 instances of the first product 108 and 10 instances of the second product 108. A licensable unit may include product data 106 including the number of instances 110 and license data 112 including the number of seats 116 a license 114 includes and/or the product designations 118 of a license 114.

In some configurations, a licensable unit may be obtained 604 as follows. For example, the computing device 102 may obtain 604 the licensable unit from a file (e.g., list, table, database, document, computer file, etc.), user input (e.g., computer, mouse, scan), network communications, etc. For instance, a file may contain a license unit. The file may be received from external media and stored in computing device 102 memory 104. The licensable unit may be additionally or alternatively obtained 604 over a network (e.g., Local Area Network (LAN), the Internet, etc.) of computing devices. Additionally or alternatively, the computing device 102 may receive user input including information about a licensable unit. In one configuration, the licensable unit may be obtained 604 from a combination of sources.

The computing device 102 may determine 606 a value 124 for a license 114. A value may be determined 606 based on any of a number of valuing criteria. Examples of a valuing criterion include price, ubiquity (e.g., the number of products to which it can be applied), length of remaining license period, opinion, etc. Based on the valuing criterion or valuing criteria that is used, a value 124 may be determined for the license 114. For example, the computing device 102 may determine 606 that the value 124 is based on ubiquity. In this scenario, the first license 114 may be determined to have a value 124 of 1 because the first license 114 only includes 1 product designation 118 (e.g., only covers 1 product 108). A value 124 may be determined for each license 114.

The computing device 102 may determine 608 if a value 124 has been determined for each of the licenses 114. If a value 124 has not been determined 608 for all the licenses 114, then the computing device 102 may determine 606 a value 124 for a license 114 that has not had a value 124 determined 606 for it. For example, if a value 124 has been determined 608 for all of the licenses 114, then the computing device 102 may sort 610 a license 114 based on the license 114 value 124.

The computing device 102 may sort 610 a license 114 based on the license 114 value 124. For example, the license 114 may be sorted 610 according to increasing value 124 (e.g., lowest value first, highest value last). For example, a first license 114 may have a value 124 of 1 and a second license 114 may have a value 124 of 2. In this case, the computing device 102 may sort 610 the first license 114 in a first position based on its low value 124 and sort the second license 114 in a second position based on its higher value 124. In other configurations, the licenses 114 may be sorted 508 according to an alternative methodology.

The computing device 102 may determine 612 if all of the licenses 114 have been sorted 610. If any of the licenses 114 have not been sorted 610, then the computing device 102 may sort 610 the license 114 that has not been sorted 610. If all of the licenses 114 have been sorted 610, then the computing device 102 may determine 614 a degree of constraint 128 for a product 108.

The computing device 102 may determine 614 a degree of constraint 128 for a product 108. The degree of constraint 128 may be a measure of how constrained a product 108b may be. For instance, the degree of constraint 128 may be determined 614 by dividing the instance count 110 for a product 108b by the number of license 114 seats 116 that are available for that product 108b (from all of the potentially covering licenses 114). In another instance, the degree of constraint 128 may be determined 614 by dividing the number of license 114 seats 116 that are available for a product 108b (from all of the potentially covering licenses 114) by the instance count 110 for that product 108b. In either of these scenarios, the degree of constraint 128 may be computed from known data, the number of instances 110 of a product 108 and/or the number of potential seats 116 in all of the potential licenses 114. For example, the computing device 102 may determine 614 the degree of constraint 128 for a product 108 to determine the most-constrained product 108.

The computing device 102 may determine 616 if the degree of constraint 128 has been determined 614 for all of the products 108. If the degree of constraint 128 has not been determined 614 for all of the products 108, then the computing device 102 may determine 614 the degree of constraint 128 for the products 108 that have not had a degree of constraint 128 determined 614. If the degree of constraint 128 has been determined 614 for all of the products 108, then the computing device 102 may sort 618 a product 108 based on the degree of constraint 128.

The computing device 102 may sort 618 each product 108 based on the degree of constraint 128. In one configuration, the products 108 may be sorted 618 according to decreasing degree of constraint 128 (e.g., highest value first, lowest value last). For example, a first product 108 may have a degree of constraint 128 of 0.800 and a second product 108 may have a degree of constraint 128 of 0.769. In this case, the computing device 102 may sort 618 the first product 108 in a first position based on its high degree of constraint 128 and sort the second product 108 in a second position based on its lower degree of constraint 128. In other configurations, the product 108 may be sorted 618 according to an alternative methodology.

The computing device 102 may determine 620 if all of the products 108 have been sorted 618. If any of the products 108 have not been sorted 618, then the computing device 102 may sort 618 a product 108 that has not been sorted 618. If all of the products 108 have been sorted 618, then the computing device 102 may allocate 622 a product 108 to a license 114 based on the degree of constraint 128 and the license 114 value 124.

The computing device 102 may allocate 622 a product 108 to a license 114 based on the degree of constraint 128 and the license 114 value 124. For example, the computing device 102 may allocate 622 the most-constrained product 108 to a least-valued license 114. In this scenario, the computing device 102 may allocate 622 the most-constrained product 108 to a least-valued license 114 by making an allocation 132 of the most-constrained product 108b to an open seat 116c of a license 114. In one configuration, the allocation 132 may be an assignment of product instances 110 to seats 116 of a license 114. In some configurations, the computing device 102 may allocate 622 a product 108 to a license 114 based on additional or alternative criteria to the degree of constraint 128 and license 114 value 124.

The computing device 102 may decrement 624 the license 114 seat 116 count. The allocation 132 of a product 108c to a seat 116b of a license 114 may reduce the amount of remaining license 114 seats 116 by 1. For example, before an allocation 132 of a product 108c to a license 114 seat 116b, a license 114 may have 3 open seats 116. Following the allocation 132 of the product 108c to the license 114 seat 116b, the license 114 may have 2 open seats 116 because 1 of the seats 116 is now occupied as a result of the allocation 132. Therefore, the number of seats 116 of the allocated license 114 may be decremented 624 to reflect the reduction in available license 114 seats 116.

The computing device 102 may decrement 626 the product 108 instance count 110. The allocation 132 of a product 108c to a seat 116b of a license 114 may reduce the amount of remaining product 108 instances that need to be allocated 132. For example, before an allocation 132 of a product 108c to a license 114 seat 116b, there may be 5 instances 110 (instance count 110=5) of a product 108. Following the allocation 132 of 1 instance 110 of the product 108c to an open seat 116 of the license 114, there may be 4 instances 110 of a product 108 remaining. Therefore, the number of instances 110 of the product 108c may be decremented 626 to reflect the reduction in product 108 instances 110 that need to be allocated.

The computing device 102 may determine 628 if all of the products 108 have been fully licensed. For example, all of the products 108 have been fully licensed when every instance 110 of every product 108 has been allocated to an applicable seat 116 of a license 114. If any of the products 108 have any instances 110 that have not been licensed, then further allocations 622 may be needed. If all of the products 108 have been fully licensed, then the computing device 102 may end 632 allocating products 108 to licenses 114.

The computing device 102 may determine 630 if all of the applicable licenses 114 have been exhausted. For example, if every applicable license 114 seat 116 is occupied and/or none of the open license 114 seats 116 will cover any of the remaining products 108. If any of the open license 114 seats 116 will cover any of the remaining products 108, then further allocations 622 may be needed. If all of the applicable licenses 114 are exhausted, then the computing device 102 may end 632 allocating products 108 to licenses 114.

If the products 108 are not fully licensed and the applicable license 114 seats 116 are not all exhausted, then the computing device may iterate through another allocation beginning by determining 614 the degree of constraint 128 for a product 108. The decrement 624 of the license 114 seat 116 count and the decrement 626 of the product 108 instance 110 count may change the degree of constraint 128 for the products 108. Therefore, determining 614 a degree of constraint for a product 108 may be required for proper allocation.

Figure 7:
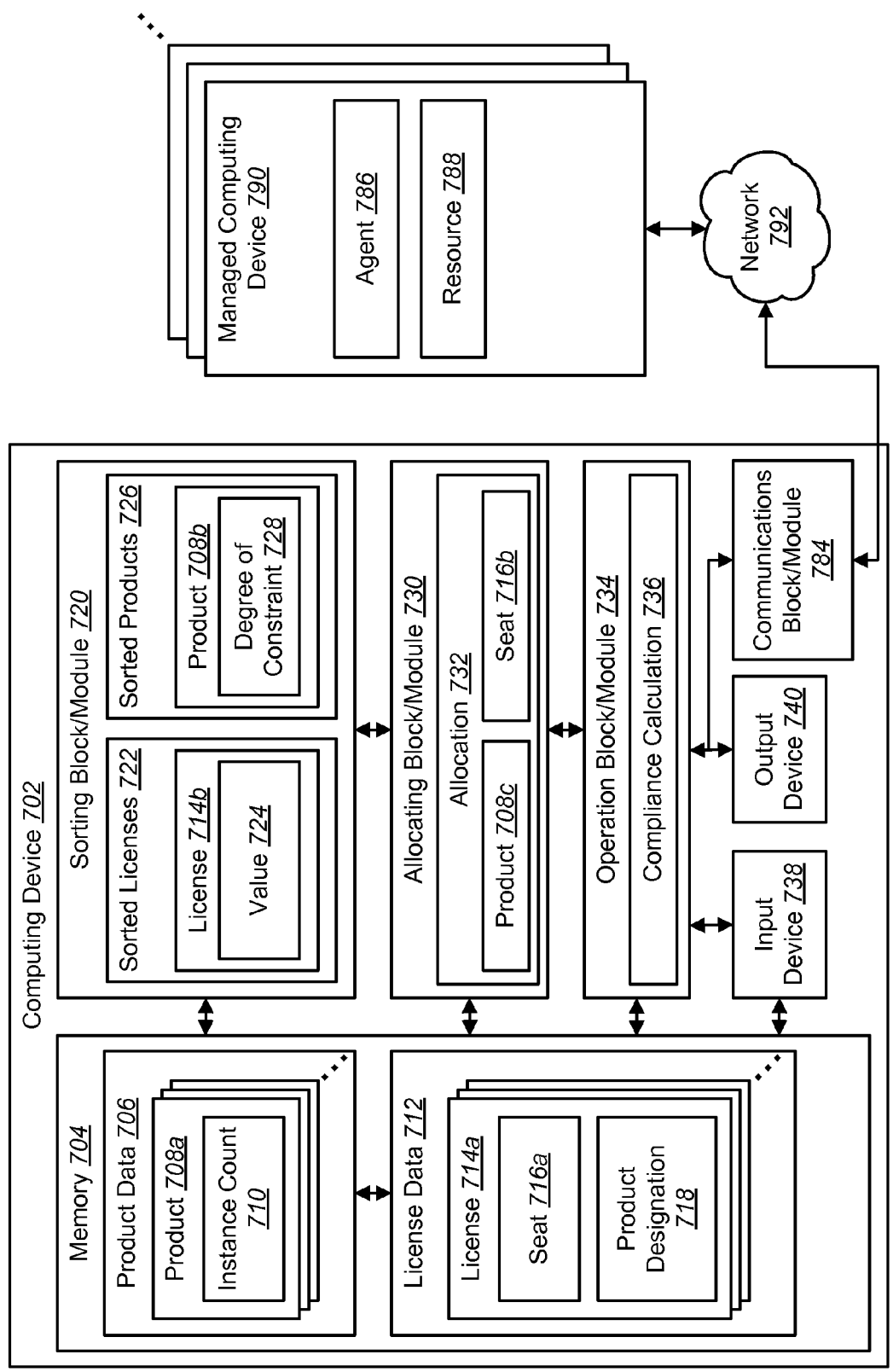
FIG. 7 is a block diagram illustrating another configuration of a computing device in which systems and methods for allocating products to licenses may be implemented.

FIG. 7 is a block diagram illustrating another configuration of a computing device 702 in which systems and methods for allocating products 708 to licenses 714 may be implemented. The computing device 702 may include a memory 704, a sorting block/module 720, an allocating block/module 730, an operation block/module 734, an input device 738 and/or an output device 740. Examples of the computing device 702 include desktop computers, laptop computers, servers, supercomputers, tablet devices, cellular phones, smartphones, gaming systems and any other computing device. As used herein, a "block/module" may be implemented in hardware, software or a combination of both.

The memory 704 may be used to store data used by the computing device 702. The memory 704 may contain product data 706 and/or license data 712. Examples of the memory 704 include dynamic random access memory (DRAM), static random access memory (SRAM), flash memory, hard disks, floppy disks, magnetic tapes, optical disks and any other data storage medium. In one configuration, the memory 704 may be directly coupled and/or indirectly coupled to each component of the computing device 702.

The product data 706 may be used to identify one or more products 708a. Examples of the product 708 include software, firmware and/or hardware, etc. For instance, a product 708 may be or may represent a program (e.g., Microsoft Word, Excel, PowerPoint, Access, Internet Explorer, Windows Media Player, Windows, Apple iTunes, OS X, etc.), firmware and/or hardware (e.g., sound card, video card, display, network card, printer, projector, processor, memory (e.g., Random Access Memory (RAM), hard drive storage, etc.), removable memory/storage, etc.). For ease of discussion, product 708 may refer to the product and/or a product identifier that identifies the product. In one configuration, the product 708 may be a string of characters that identifies the product 708. For example, the product 708 may refer to the identifying string "Microsoft Office 2010". The product 708 may include (data representing) an instance count 710. The instance count 710 may be used to identify the number of instances of a product 708 that are installed. For example, if each managed computing device in a network of 10 managed computing devices had Microsoft Office 2010 installed, then the instance count 710 for Microsoft Office 2010 may be 10. In some configurations, the product data 706 may include additional information about the product 708. For example, the installation date and/or usage statistics for each instance 710 of a product 708. Product data 706 may be stored on the computing device 702 and/or received from some external source, such as a network, from the input device 738 (e.g., from a user) and/or from an external drive, etc.

The license data 712 may include data about one or more licenses 714a. A license 714 may govern the use and/or redistribution of a product 708 (e.g., cover a product 708). In one configuration, a license 714 may cover more than one product 708. Similarly, a product 708 may be covered by more than one license 714. For example, the license data 712 may include an original equipment manufacturer (OEM) license 714 for covering a single product 708 (e.g., Microsoft Office Professional 2010). In another example, the license data 712 may include a volume license 714 with downgrade rights (e.g., Microsoft Office Enterprise 2010) that may cover multiple products 708 (e.g., Microsoft Office Enterprise 2010, Microsoft Office Enterprise 2007). For ease of discussion, license 714 may refer to the license 714 and/or a license identifier 714 that identifies the license 714. In one configuration, the license 714 may be a string of characters that identifies the license 714. For example, the license 714 may refer to the identifying string "Microsoft Windows 7 Enterprise".

The license 714 may include one or more seats 716a and/or one or more product designations 718. The number of seats 716a that a license 714 includes defines the number of products 708 that may be covered by the license 714. For example, a license 714 with 1 seat 716a can cover at most 1 product 708 at any given time. Similarly, a license 714 with 5 seats 716a can cover at most 5 products 708 at any given time. The one or more product designations 718 define the products 708 that are covered by the license 714. Thus, a license 714 may only cover the number of products 708 that it contains a seat 716 for and that are designated by the one or more product designations 718. For example, a license 714 may include a product designation 718 for Microsoft Office 2010, a product designation 718 for Microsoft Office 2007 and 5 seats 716. Thus, this license 714 could cover any 5 products 708 that comprise any combination of Microsoft Office 2010 and Microsoft Office 2007. In one configuration, the license data 712 may include information about the duration (e.g., expiration) of a license 714. License data 712 may be stored on the computing device 702 and/or received from some external source, such as a network, from the input device 738 (e.g., from a user) and/or from an external drive, etc.

The sorting block/module 720 may be used to sort objects based on one or more criteria. In one configuration, the sorting block/module 720 may sort one or more licenses 714b into a group of sorted licenses 722. Examples of the group of sorted licenses 722 include arrays, lists, trees, hashes, stacks, queues, maps, etc. The sorting block/module 720 may sort the licenses 714b based on one or more criteria. In one configuration, the sorting block/module 720 may sort the licenses 714b based on the value 724 of each license 714b. For example, a license 714b may be sorted according to increasing value 724 (e.g., lowest value first, highest value last). In another example, a license 714b may be sorted according to decreasing value 724 (e.g., highest value first, lowest value last).

Each license 714b may include a value 724. The value 724 of a license 714b may be derived automatically and/or manually assigned based on one or more criteria. Any of a number of different criteria may be used to determine the value 724 of a license 714b. Examples of a valuing criterion include price, ubiquity (e.g., how many different products to which it can be applied), number of seats 716 (e.g., how many seats 716 that the license 714 includes), length of remaining license period, opinion, etc. The valuing criteria may be predefined or dynamically determined.

The sorting block/module 720 may sort (e.g., rank) the one or more licenses 714 into a group of sorted licenses 722 based on the value 724 of each license 714b. For example, a first license 714 has 10 seats 716 that can cover a first product 708. A second license 714 has 5 seats 716 that can cover the first product 708 and a second product 708. A third license 714 has 8 seats 716 that can cover the second product 708. If the valuing criterion is ubiquity (e.g., the number of products 708 to which it can be applied), then the second license 714 is the most valuable license 714 because it may be applied to both the first product 708 and the second product 708. Under the criterion of ubiquity, the first license 714 and third license 714 may be of equal value because each license only covers a single product 708. In one instance, the first license 714 and the second license 714 may be arbitrarily assigned a value 724. In another instance, a second criterion may be used (e.g., number of seats 716). In this instance, the first license 714 may be valued lower because it includes more seats 716 than the third license 714. The resulting group of sorted licenses 722 may be ordered (e.g., lowest value first, highest value last) as the first license 714, the third license 714 and the second license 714.

In one configuration, a group of sorted licenses 722 may be formed for each product 708b. Applying the previous example to this scenario, the first product 708 may only be covered by the first license 714 and the second license 714. The sorting block/module 720 may sort the first license 714 and the second license 714 based on the value 724 of the first license 714 and the value 724 of the second license 714 (the value 724 being determined by the ubiquity criterion, for example) resulting in a group of sorted licenses 722 for the first product 708 that is ordered (e.g., lowest value first, highest value last) as the first license 714 and the second license 714. Similarly, the second product 708 may only be covered by the second license 714 and the third license 714. The sorting block/module 720 may sort the second license 714 and the third license 714 based on the value 724 of the second license 714 and the value 724 of the third license 714 (the value 724 being determined by the ubiquity criterion, for example) resulting in a group of sorted licenses 722 for the second product 708 that is ordered (e.g., lowest value first, highest value last) as the third license 714 and the second license 714.

In one configuration, the one or more groups of sorted licenses 722 or information about the one or more groups of sorted licenses 722 may be made available to the allocating block/module 730. For example, when the sorting block/module 720 includes a group of sorted licenses 722 for each product 708, then the allocating block/module 730 may only need the first item in the group of sorted licenses 722 (e.g., if the lowest-valued license 714 is desired and the group of sorted licenses 722 is ordered lowest value first, highest value last). In some configurations, where the group of sorted licenses 722 is sorted differently (e.g., highest value first, lowest value last), then the allocating block/module 730 may only need the last item in the group of sorted licenses 722. Additionally or alternatively, the group of sorted licenses 722 may be stored in memory 704 for future use by the computing device 702 and/or other programs/devices.

In another configuration, the sorting block/module 720 may sort one or more products 708b into a group of sorted products 726. Examples of the group of sorted products 726 include arrays, lists, trees, hashes, stacks, queues, maps, etc. The sorting block/module 720 may sort the products 708b based on a degree of constraint 728. The degree of constraint 728 may be a measure of the how constrained a product 708b may be. For instance, the degree of constraint 728 may be determined by dividing the instance count 710 for a product 708b by the number of license 714 seats 716 that are available for that product 708b (from all of the potentially covering licenses 714). In another instance, the degree of constraint 728 may be determined by dividing the number of license 714 seats 716 that are available for a product 708b (from all of the potentially covering licenses 714) by the instance count 710 for that product 708b. In some configurations, the degree of constraint 728 may be determined using different parameters.

The degree of constraint 728 may be determined for each product 708b. In one configuration, the sorting block/module 720 may determine the degree of constraint 728 for a product 708b and then sort (e.g., rank) the product 708b based on the degree of constraint 728. For example, a product 708b may be sorted according to decreasing degree of constraint 728 (e.g., highest degree of constraint first, lowest degree of constraint last). The degree of constraint 728 may be determined dynamically. In one configuration, the degree of constraint 728 may be determined dynamically upon any change in the parameters that determine the degree of constraint 728. The sorting block/module 720 may sort the one or more products 708 into a group of sorted products 726 based on the degree of constraint 728 of each product 708b.

For example, there are 12 instances of a first product 708 and 10 instances of a second product 708. A first license 714 has 10 seats 716 that can cover the first product 708, a second license 714 that has 5 seats 716 that can cover the first product 708 and the second product 708 and a third license 714 that has 8 seats 716 that can cover the second product 708. If the degree of constraint 728 is determined by dividing the instance count 710 for a product 708 by the number of license 714 seats 716 that are available for that product 708, then the degree of constraint 728 for the first product 708 is 12 installations/15 seats (10 from the first license 714 and 5 from the second license 714)=0.800. The degree of constraint 728 for the second product 708 is 10 installations/13 seats (8 from the third license 714 and 5 from the second license 714)=0.769.

In this example, the first product 708 has a higher degree of constraint 728 than the second product 708. If the sorting block/module 720 is sorting based on highest degree of constraint first and lowest degree of constraint last, then the sorting block/module 720 may sort the first product 708 higher than the second product 708. This sorting may result in a group of sorted products 726 that is ordered as the first product 708 and the second product 708. In one configuration, the one or more groups or information about the one or more groups of sorted products 726 may be made available to the allocating block/module 730. Additionally or alternatively, the group of sorted licenses 722 may be stored in memory 704 for future use by the computing device 702 and/or any other programs/devices.

The allocating block/module 730 may be used to make an allocation 732 of a product 708c to a seat 716b. The allocation 732 may be based on the degree of constraint 728 of a product 708 and/or the value 724 of a license 714. For example, the allocating block/module 730 may make an allocation 732 of the most-constrained product 708c to a seat 716b of the lowest-valued applicable license 714.

Continuing the example from above, the first product 708 was determined by the sorting block/module 720 to have the highest degree of constraint 728. Therefore, the first product 708 may be the most-constrained product 708. As a result of being the most-constrained product 708, the first product 708 may be the first item in the group of sorted products 726. Because the first product 708 may only be covered by either the first license 714 or the second license 714 then the lowest-valued applicable license 714 will be the lowest-valued license 714 between the first license 714 and the second license 714. The first license 714 was determined by the sorting block/module 720 to have the lowest value 724 of all of the licenses 714. Therefore, the first license 714 may be the lowest-valued applicable license 714 and may be the first item in the group of sorted licenses 722. In this scenario, an allocation 732 may be made between the first product 708c and a seat 716b of the first license 714.

The first license 714 does not cover the second product 708. Therefore, the first license 714 may not be considered in determining the lowest-valued license 714 for the second product 708. Both the second license 714 and the third license 714 may cover the second product 708. The third license 714 was determined by the sorting block/module 720 to have the lowest value 724 between the second license 714 and the third license 714. Therefore, the third license 714 may be the lowest-value applicable license 714 for the second product 708. In this scenario, an allocation 732 may be made allocating the second product 708c to a seat 716b of the third license 714.

In one configuration, the allocating block/module 730 may make allocations 732 dynamically based on the most-constrained product 708 and the lowest-valued applicable license 714. For example, the allocating block/module 730 may make an allocation 732 every time a product 708c and seat 716c of a license 714 is made available to it. The allocations 732 may be recorded and/or stored in memory 704 for use by the computing device 702 and/or any other programs/devices.

The operation block/module 734 may be used for performing an operation based on the one or more allocations 732. Examples of performing an operation based on an allocation 732 include sending licenses to other computing devices, notifying users of other computing devices to use a particular license 714, revoking a license 714, distributing a license 714, ordering more licenses 714, performing a compliance calculation 736, generating a compliance report based on the compliance calculation 736, sending a message based on allocation 732 information, outputting information to an output device 740, etc. The compliance calculation 736 may determine if the products 708 are properly and/or adequately licensed 714.

The input device 738 may be used to receive input. Examples of input devices 738 include keyboards, mice, cameras, touch screens, microphones, etc. For instance, a user may use an input device 738 to interact with the product data 706, the license data 712 and the function of the computing device 702. In one configuration, an input device 738 may be used to input the license data 712. In another configuration, program settings may be used to direct the function of the computing device 702. For example, the input device 738 may direct the operation block/module 734 to output the results of a compliance calculation 736 to an output device 740.

The output device 740 may be used to output the results of the operation block/module 734. In one configuration, the operation block/module 734 may output the result of a compliance calculation 736. In another configuration, the operation block/module 734 may send one or more allocations 732 to the output device 740 to be stored or displayed for a user.

The computing device 702 may communicate with one or more managed computing devices 790. For example, the computing device 702 may be used to manage one or more managed computing devices 790. The managed computing devices 790 may be other computing devices such as desktop computers, laptop computers, tablet devices, smartphones, cellular phones, gaming consoles, etc. In one configuration, the computing device 702 may send messages to one or more managed computing devices 790 instructing the managed computing device(s) 790 to perform operations. For instance, a computing device 702 may instruct one or more managed computing devices 790 to install software, uninstall software, remove a license 714 from a resource 788, apply a license 714 to a resource 788, shut down, reboot, install a patch or update for a resource 788, block access to one or more resource 788 on the managed computing devices 790, allow access to one or more resources 788 on the managed computing devices 790, etc.

Communications between the computing device 702 and the one or more managed computing devices 790 may occur using a network 792. Examples of the network 792 include Local Area Networks (LANs), the Internet, Wide Area Networks (WANs), etc.

The one or more managed computing devices 790 may each include an agent 786 and one or more resources 788. Examples of resources 788 include products 708, software, firmware and/or hardware included on the managed computing device 790. For instance, a resource 788 may be a program (e.g., Microsoft Word, Excel, PowerPoint, Access, Internet Explorer, Windows Media Player, Windows, Apple iTunes, OS X, etc.), firmware and/or hardware (e.g., sound card, video card, display, network card, printer, projector, processor, memory (e.g., Random Access Memory (RAM), hard drive storage, etc.), removable memory/storage, etc.). In one configuration, a product 708 may represent a resource 788.

The agent 786 may be software and/or hardware that is used to manage and/or perform operations on the managed computing device 790. For example, the agent 786 may receive and perform instructions from the computing device 702. For instance, the agent 786 may install software, uninstall software, remove a license 714 from a resource 788, apply a license 714 to a resource 788, shut down, reboot, install a patch or update for a resource 788, block access to one or more resource 788 on the managed computing devices 790, allow access to one or more resources 788 on the managed computing device 790, etc. This may be done according to instructions received from the computing device 702, for example.

The computing device 702 may use the communications block/module 784 to communicate with one or more managed computing devices 790 using a network 792. For example, the communications block/module 784 may format and/or send messages to the one or more managed computing devices 790 using the network 792. Additionally or alternatively, the communications block/module 784 may receive messages from the one or more managed computing devices 790, which it 784 may provide to the operations block/module 734.

In one configuration, the computing device 702 may perform one or more operations based on communications with the one or more managed computing devices 790. For example, the computing device 702 may receive information from a managed computing device 790 indicating that a new resource 788 (e.g., Adobe Acrobat Professional) has been installed. The communications block/module 784 may receive this message and may provide it to the operations block/module 734. The operations block/module 734 may store product data 706 about Adobe Acrobat Professional. For instance, a product 708 (e.g., product identifier) for Adobe Acrobat Professional may be stored in memory 704 and the instance count 710 may be incremented. In another instance, a product 708 for Adobe Acrobat Professional may already be stored in memory 704 and therefore, the instance count 710 for the Adobe Acrobat Professional product 708 may be incremented to reflect the new installation of Adobe Acrobat Professional. The computing device 702 may utilized the systems and methods disclosed herein to iteratively allocate the most-constrained product 708 to the least-valued license 714 and perform a compliance calculation 736.

In another example, the computing device 702 may send information and/or commands to the one or more managed computing devices 790 to license 714 and/or relicense 714 resources 788 according to the allocations 732 determined by the allocating block/module 730. For example, an installation of Microsoft Office 2007 may be licensed with a license 714 for Microsoft Office 2010. The iterative allocations of the most-constrained product 708 to the least-valued license 714 may indicate that the installation of Microsoft Office 2007 product 708 may be allocated a seat 716 of a Microsoft Office 2007 license 714. In this scenario, the Microsoft Office 2007 product 708 installation may be relicensed with the Microsoft Office 2007 license 714. This may open a seat 716 for the Microsoft Office 2010 license 714. This may be a desired result if the Microsoft Office 2010 license 714 is a more valuable license 714.

In one configuration, the systems and methods disclosed herein may be applied to a software license monitoring application (on the computing device 702, for example). This software license monitoring application may use inventory data captured by an inventory component of the computing device 702 (not illustrated in FIG. 7), and may add software license monitoring-specific data to a database accessible to (and accessed by) a broader set of applications. For example, one or more managed computing devices 790 may send inventory data (e.g., products used, licenses used, etc.) to the computing device 702 for monitoring. This inventory data may be stored and/or incorporated into the product data 706 and/or license data 712 by the computing device 702 as discussed above.

Other applications may use the software license monitoring data. However, the software license monitoring application may primarily be a consumer of the inventory data. Automatically and/or dynamically allocating products 708 to license 714 seats 716 based on the degree of constraint 728 of the product 708 and the value 724 of the license 714 may enable cost savings as a result of improved allocations 732. In one configuration, the allocations 132 may benefit a compliance calculation 736. For example, the results of the compliance calculation 736 may be output to a user through the output device 740. The results of the compliance calculation 736 may indicate the status of compliance, the minimum number of license 714 seats 716 that need to be purchased, the value 724 of licenses 714 that need to be purchased, the number of open license 714 seats 716 that are available, the products 708 and number of instances 710 that may be installed due to license 714 over-compliance and/or the products 708 and number of instance 710 that are under-compliant.

The users of the software license monitoring application may be concerned with the ethical/legal/financial implications of product usage. For example, the users may want to make sure that they have license seats sufficient to cover the product usage within an organization (or risk having to pay fines when they are audited). Furthermore, they may want to reduce over-licensing (e.g., having purchased a greater quantity or quality of license seats than are used). Consequently, the systems and methods disclosed herein may be useful in multiple places in software license management.

For example, they may be used to facilitate the user's quickly narrowing down the list of resources 788 and/or products 708 (and their respective usages) of concern (either because the manufacturers of such products are prone to conduct audits, or because the costs of licensing the products is high).

Figure 8:
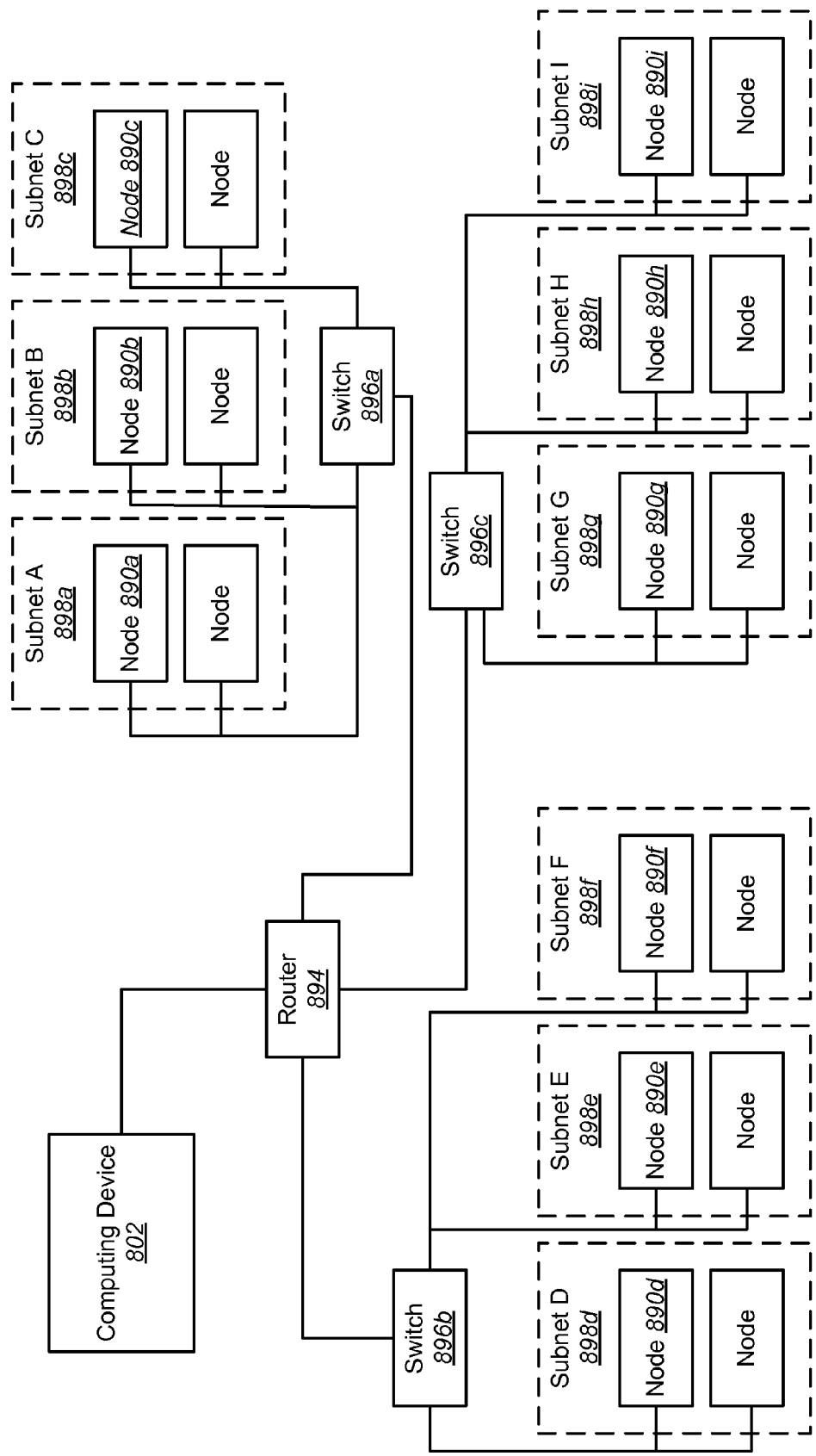
FIG. 8 is a block diagram that illustrates one configuration of a network where systems and methods for allocating products to licenses on a computing device may be implemented.

FIG. 8 is a block diagram that illustrates one configuration of a network where systems and methods for allocating products to licenses on a computing device 802 may be implemented. A computing device 802 is connected to a router 894. The router 894 is connected to switches 896a, 896b and 896c. Switch 896a is connected to several nodes 890a, 890b, 890c, etc., via their respective subnets 898a, 898b and 898c. The switch 896b is connected to several nodes 890d, 890e, 890f, etc., via their respective subnets 898d, 898e and 898f. The switch 896c is connected to several nodes 890g, 890h, 890i, etc., via their respective subnets 898g, 898h, 898i. In FIG. 8, the nodes 890 may be, for example, managed computing devices 790. Although FIG. 8 only shows one router 894, and a limited number of switches 896, subnets 898 and nodes 890, many and varied numbers of routers 894, switches 896, subnets 898, and nodes 890 may be included in networks and/or systems where systems and methods for allocating products to licenses on a computing device may be implemented.

Figure 9:
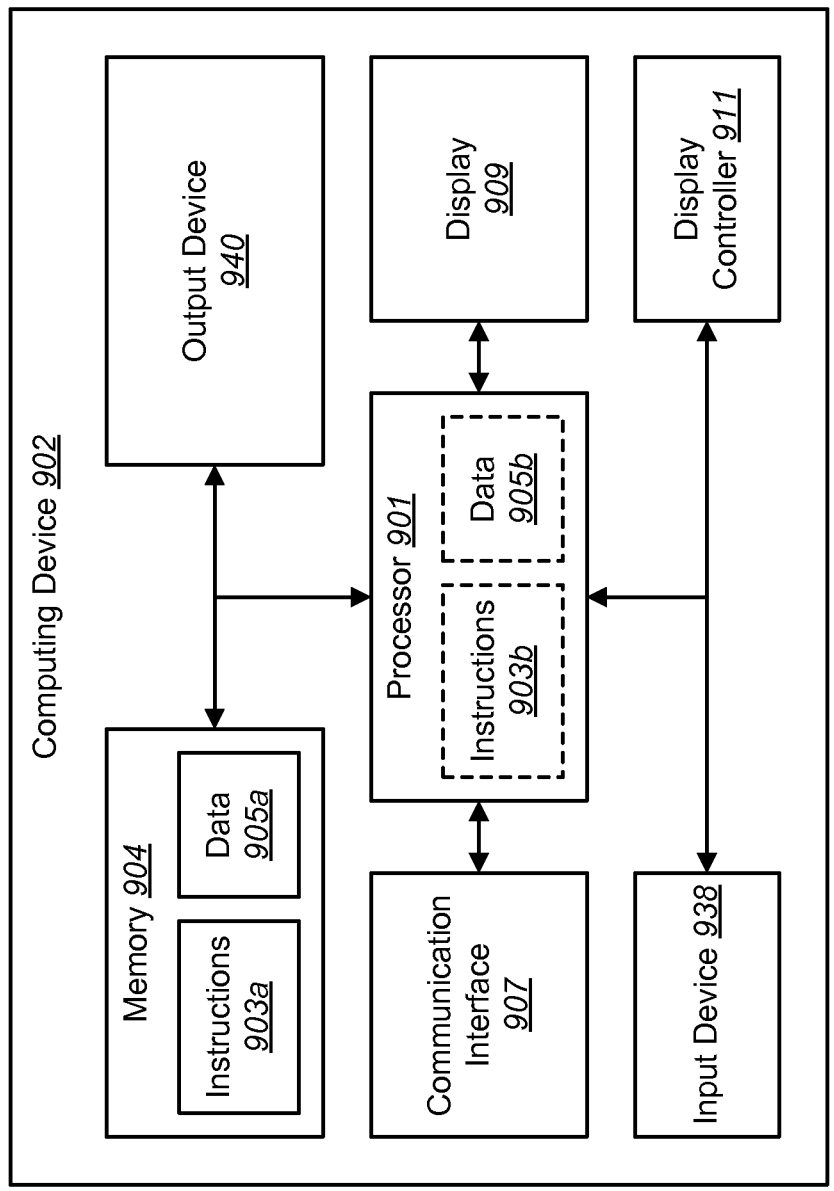
FIG. 9 illustrates various components that may be utilized on a computing device.

FIG. 9 illustrates various components that may be utilized on a computing device 902. The computing device 702, 802 and/or managed computing device(s) 790 described above may be configured similar to the computing device 902 illustrated in FIG. 9. For example, the computing device 902 may be configured to perform one or more of the methods 200, 500, 600 described above. The illustrated components may be located within the same physical structure or in separate housings or structures.

The computing device 902 may include a processor 901 and memory 904. The processor 901 controls the operation of the computing device 902 and may be embodied as a microprocessor, a microcontroller, a digital signal processor (DSP) or other device known in the art. The memory 904 may include instructions 903a and data 905a. The processor 901 typically performs logical and arithmetic operations based on program instructions 903a and data 905a stored within the memory 904. That is, instructions 903b and data 905b may be stored and/or run on the processor 901.

The computing device 902 typically may include one or more communication interfaces 907 for communicating with other electronic devices. The communication interfaces 907 may be based on wired communication technology, wireless communication technology, or both. Examples of different types of communication interfaces 907 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter and so forth.

The computing device 902 typically may include one or more input devices 938 and one or more output devices 940. Examples of different kinds of input devices 938 include a keyboard, mouse, microphone, remote control device, button, joystick, trackball, touchpad, lightpen, etc. Examples of different kinds of output devices 940 include a speaker, printer, etc. One specific type of output device that may be typically included in a computer system is a display device 909. Display devices 909 used with embodiments disclosed herein may utilize any suitable image projection technology, such as a cathode ray tube (CRT), liquid crystal display (LCD), light-emitting diode (LED), gas plasma, electroluminescence or the like. A display controller 911 may also be provided for converting data stored in the memory 904 into text, graphics and/or moving images (as appropriate) shown on the display device 909.

Of course, FIG. 9 illustrates only one possible configuration of a computing device wherein systems and methods for determining a group based on a relationship may be performed. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. It should be noted that a computer-readable medium may be non-transitory and tangible. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method(s). The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A computing device configured for allocating products to licenses, comprising:
   a processor;
   a memory in electronic communication with the processor;
   instructions stored in the memory, the instructions being executable to:
   obtain a license data value for each of a plurality of licenses;
   obtain product data that identifies a plurality of products;
   determine a degree of constraint for each of the plurality of products;
   allocate a product with a highest degree of constraint to a license with a least license value;
   repeat the determining and the allocating until each license is allocated or each product is allocated a license; and
   perform an operation based on the allocation.

2. The computing device of claim 1, wherein the instructions are further executable to sort each of the plurality of licenses based on the license value.

3. The computing device of claim 1, wherein the instructions are further executable to sort each of the plurality of products based on the degree of constraint.

4. The computing device of claim 1, wherein performing an operation based on the allocation comprises performing a compliance calculation.

5. The computing device of claim 1, wherein the license data comprises a licensable unit of related licenses.

6. The computing device of claim 1, wherein the product data comprises a licensable unit of related products.

7. A method for allocating products to licenses on a computing device, comprising:
- obtaining, by the computing device, a license data value for each of a plurality of licenses;
- obtaining, by the computing device, product data that identifies a plurality of products;
- determining, by the computing device, a degree of constraint for each of the plurality of products;
- allocating, by the computing device, a product with a highest degree of constraint to a license with a least license value;
- repeating the determining and the allocating until each license is allocated or each product is allocated a license; and
- performing an operation based on the allocation.

8. The method of claim 7, further comprising sorting each of the plurality of licenses based on the license value.

9. The method of claim 7, further comprising sorting each of the plurality of products based on the degree of constraint.

10. The method of claim 7, wherein performing an operation based on the allocation comprises performing a compliance calculation.

11. The method of claim 7, wherein the license data comprises a licensable unit of related licenses.

12. The method of claim 7, wherein the product data comprises a licensable unit of related products.

13. A non-transitory, tangible computer-readable medium for allocating products to licenses, comprising executable instructions for:
- obtaining a license data value for each of a plurality of licenses;
- obtaining product data that identifies a plurality of products;
- determining a degree of constraint for each of the plurality of products;
- allocating a product with a highest degree of constraint to a license with a least license value;
- repeating the determining and the allocating until each license is allocated or each product is allocated a license; and
- performing an operation based on the allocation.

* * * * *